(12) United States Patent
Wang et al.

(10) Patent No.: US 8,282,004 B2
(45) Date of Patent: Oct. 9, 2012

(54) FOCUSING APPARATUS AND TERMINAL COMPRISING VARIABLE FOCUS LENS ASSEMBLY

(75) Inventors: Ynjiun P. Wang, Cupertino, CA (US);
Donald Anderson, Locke, NY (US);
Samuel Bingo, Auburn, NY (US);
Robert Bowker, Cortland, NY (US);
James A. Cairns, Skaneateles Falls, NY (US); Chen Feng, Snohomish, WA (US);
Colleen P. Gannon, Jordan, NY (US);
Jeffery Gilfus, Weedsport, NY (US);
William H. Havens, Syracuse, NY (US);
Robert John Hennick, Cayuga, NY (US); Robert Hunsinger, Plainville, NY (US); Michael Sterling, Weedsport, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 501 days.

(21) Appl. No.: 12/432,480

(22) Filed: Apr. 29, 2009

(65) Prior Publication Data
US 2010/0276492 A1    Nov. 4, 2010

(51) Int. Cl.
*G06K 7/00* (2006.01)
*G06K 7/10* (2006.01)
*G02B 1/06* (2006.01)
*G02B 3/12* (2006.01)

(52) U.S. Cl. .............. 235/470; 235/435; 235/462.01; 235/462.35; 359/665; 359/666

(58) Field of Classification Search .......... 235/470, 235/462.01–462.49, 435; 359/665–666
See application file for complete search history.

(56) References Cited

U.S. PATENT DOCUMENTS

| | | | |
|---|---|---|---|
| 5,473,149 A * | 12/1995 | Miwa et al. | 235/462.41 |
| 5,945,670 A | 8/1999 | Rudeen | |
| 6,024,283 A | 2/2000 | Campanelli et al. | |
| 6,062,476 A | 5/2000 | Stern et al. | |
| 6,188,526 B1 | 2/2001 | Sasaya et al. | |
| 6,246,528 B1 | 6/2001 | Schachar | |
| 6,288,846 B1 | 9/2001 | Stoner, Jr. | |
| 6,344,930 B1 | 2/2002 | Kaneko et al. | |
| 6,543,693 B1 | 4/2003 | Stern et al. | |
| 6,618,208 B1 | 9/2003 | Silver | |
| 6,658,208 B2 | 12/2003 | Watanabe et al. | |
| 6,935,743 B2 | 8/2005 | Shadduck | |
| 7,025,468 B2 | 4/2006 | Nishioka et al. | |

(Continued)

FOREIGN PATENT DOCUMENTS
EP    1450291    8/2004
(Continued)

OTHER PUBLICATIONS

Varioptic's Liquid Auto-Focus Lens Wins 1st Prize in 2006 Dupont Plunkett Awards for Innovation With Teflon® (4 pages).

(Continued)

*Primary Examiner* — Michael G Lee
*Assistant Examiner* — Laura Gudorf
(74) *Attorney, Agent, or Firm* — Heslin Rothenberg Farley & Mesiti P.C.

(57) ABSTRACT

There is described a focusing apparatus having a deformable membrane that at least partially defines a cavity and an optical fluid disposed in the cavity. An actuator assembly can be provided for imparting a force to the deformable membrane. In one embodiment, the actuator assembly can include a piezoelectric actuator.

29 Claims, 15 Drawing Sheets

U.S. PATENT DOCUMENTS

| | | | |
|---|---|---|---|
| 7,068,439 B2 | 6/2006 | Esch et al. | |
| 7,077,322 B2 | 7/2006 | Miyazawa et al. | |
| 7,128,270 B2 | 10/2006 | Silverbrook et al. | |
| 7,201,318 B2 | 4/2007 | Craen et al. | |
| 7,243,849 B2 | 7/2007 | Lapstun et al. | |
| 7,264,162 B2 | 9/2007 | Barkan | |
| 7,296,749 B2 | 11/2007 | Massieu | |
| 7,352,434 B2 | 4/2008 | Streefkerk et al. | |
| 7,369,723 B1 | 5/2008 | Mescher | |
| 7,416,125 B2 | 8/2008 | Wang et al. | |
| 7,450,273 B2 | 11/2008 | Silverbrook et al. | |
| 7,826,144 B2 * | 11/2010 | Mescher | 359/665 |
| 2005/0200973 A1 | 9/2005 | Kogo et al. | |
| 2005/0218231 A1 * | 10/2005 | Massieu | 235/472.01 |
| 2007/0030573 A1 * | 2/2007 | Batchko et al. | 359/665 |
| 2007/0097528 A1 | 5/2007 | Hagiwara et al. | |
| 2007/0146894 A1 * | 6/2007 | Humpston | 359/666 |
| 2007/0211207 A1 | 9/2007 | Lo et al. | |
| 2008/0019015 A1 | 1/2008 | Fernandez et al. | |
| 2008/0144185 A1 | 6/2008 | Wang et al. | |
| 2008/0204905 A1 | 8/2008 | Mizuno et al. | |
| 2008/0218873 A1 | 9/2008 | Batchko et al. | |
| 2008/0231963 A1 * | 9/2008 | Batchko et al. | 359/665 |
| 2008/0245872 A1 | 10/2008 | Good | |
| 2008/0259463 A1 * | 10/2008 | Shepherd | 359/666 |
| 2008/0277477 A1 | 11/2008 | Thuries et al. | |
| 2008/0277480 A1 | 11/2008 | Thuries et al. | |
| 2008/0316610 A1 * | 12/2008 | Dobrusskin | 359/666 |
| 2009/0097140 A1 | 4/2009 | Choi et al. | |
| 2010/0182703 A1 | 7/2010 | Bolis | |
| 2010/0232161 A1 * | 9/2010 | Aschwanden et al. | 362/278 |

FOREIGN PATENT DOCUMENTS

| | | |
|---|---|---|
| JP | 2002162506 | 6/2002 |
| WO | WO-9415351 | 7/1994 |
| WO | WO-2005073895 | 8/2005 |
| WO | WO-2008035983 A1 | 3/2008 |
| WO | WO-2008076399 | 6/2008 |
| WO | WO-2008124235 | 10/2008 |
| WO | WO-2009010559 A1 | 1/2009 |

OTHER PUBLICATIONS

Nelson, Lee: Liquid Lens—Technology, Photonics, Vision systems design, Advanced imaging URL: http://articles.directorym.net/LIQUID_LENS-a906589.html (5 pages).

Hayes, Tim: Fluidic lenses move from laboratory to factory Aug. 2007 URL: http://optics.org/cws/article/industry/30803 (2 pages).

European Patent Office, European Search Report of EP Application No. EP10 161 206.7, dated Jul. 28, 2010 (3 pgs.).

European Patent Office, Communication Pursuant to Article 94(3) EPC, EP Application No. 10 161 206.7, dated Aug. 12, 2010, (6 pgs.).

Sebastien Bolis, Optical Device with Means of Actuating a Compact Deformable Membrane. WO Publication No. 2009010559-A1 dated Jan. 22, 2009 (96 pages), submitted together with corresponding U.S. Publication No. 2010/0182703-A1 dated Jul. 22, 2010 (38 pages), which serves as an English translation.

* cited by examiner

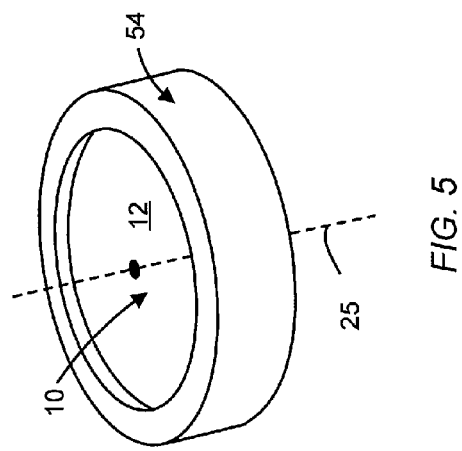
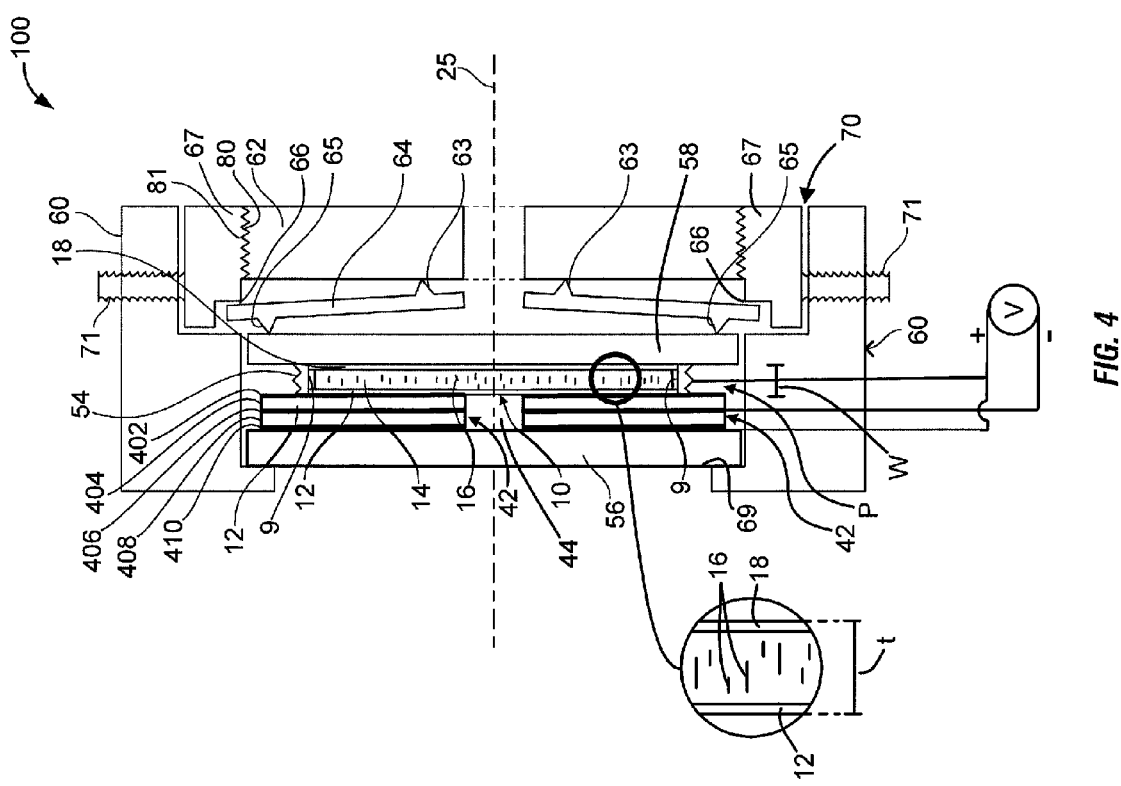

| TEMP | LENS SETTING | | |
|---|---|---|---|
| | 6" | 20" | 34" |
| (-40)-0 | $P_{0N}$ | $P_{0I}$ | $P_{0F}$ |
| 0 - 40 | $P_{1N}$ | $P_{1I}$ | $P_{1F}$ |
| 40 - 80 | $P_{2N}$ | $P_{2I}$ | $P_{2F}$ |
| 80 - 120 | $P_{3N}$ | $P_{3I}$ | $P_{3F}$ |
| 120 - 160 | $P_{4N}$ | $P_{4I}$ | $P_{4F}$ |

FOCUSING APPARATUS AND TERMINAL COMPRISING VARIABLE FOCUS LENS ASSEMBLY

FIELD OF THE INVENTION

The present invention relates in general to optical systems and specifically to optical systems having optical characteristics that can be varied.

BACKGROUND OF THE INVENTION

Variable lenses, e.g., multiple focus lenses and zoom lenses have traditionally employed one or more non-deformable (i.e., rigid such as glass or polycarbonate) lens elements which are moved along an imaging axis by forces often supplied by a motor.

In recent years, motorless electro-responsive lens elements have attracted increased attention of researchers and designers of optical systems. One type of motorless electro-responsive lens element is the "fluid lens" lens element which in one form can include a rigid or elastomeric membrane filled with one or more fluids having indices of refraction greater than 1. Fluid lens element technology has attracted the attention of many designers of optical systems who generally see traditional solid lens elements and motor equipped systems as bulky and energy hungry. With the proposals for fluid lens elements there have been proposed various methods for varying an optical property of a fluid lens element for integration into an optical system.

According to a process of electro wetting, a fluid lens element is provided having at least two immiscible fluids and a voltage is applied to the fluid lens element. A surface tension of the fluid lens element changes as a result of the voltage being applied, bringing about a change in the curvature of an interface between the at least two fluids.

In U.S. Publication No. 2008/0144185, a fluid lens element is described having a deformable membrane partially defining a cavity that holds optical fluid. An actuator assembly comprising an actuator is provided for imparting a force on the deformable membrane.

SUMMARY OF THE INVENTION

There is described a focusing apparatus having a deformable membrane that at least partially defines a cavity and an optical fluid disposed in the cavity. An actuator assembly can be provided for imparting a force to the deformable membrane. In one embodiment, the actuator assembly can include a piezoelectric actuator.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4 is a cross sectional side view of a focusing apparatus in another embodiment;

FIG. 5 is a perspective view showing a resilient member in combination with a fluid lens element;

DETAILED DESCRIPTION OF THE INVENTION

Figure 2:
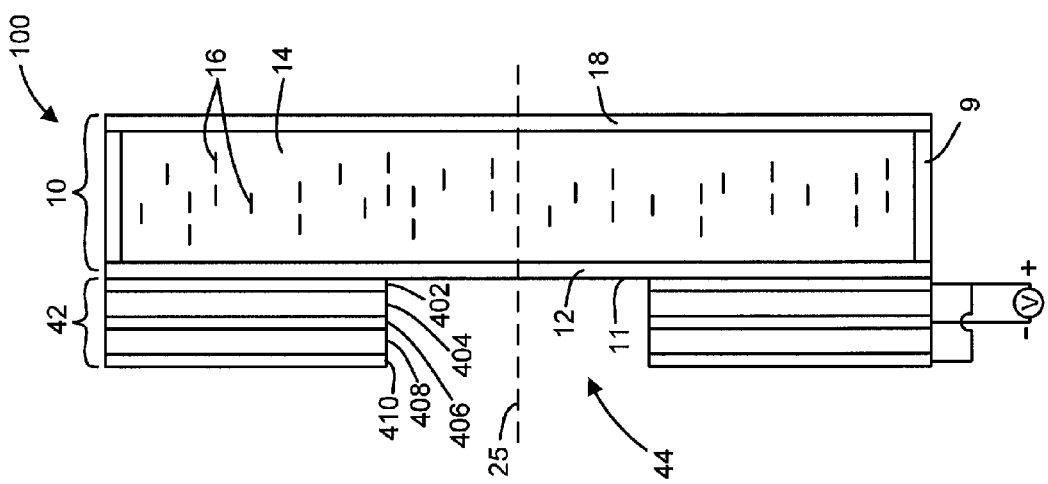
FIG. 2 is a side view of a focusing apparatus with a disc actuator thereof in a bended state.
Figure 1:
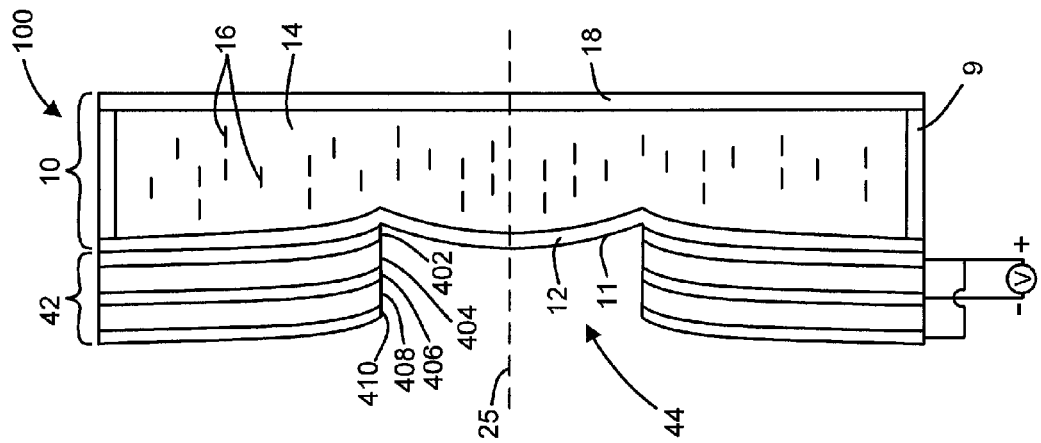
FIG. 1 is a cross sectional side view of a focusing apparatus with a disc actuator thereof in an unbended state.

Referring to FIGS. 1 and 2, there are shown cross sectional side views of a focusing apparatus 100 comprising a deformable lens element 10 and an actuator assembly which in one particular example can comprise a piezoelectric actuator 42. Fluid lens element 10 can include a light transmissive deformable membrane 12 and a cavity 14 holding optical fluid 16, delimited on one side by deformable membrane 12 and on opposite side by light transmissive member 18. Light transmissive member 18 can be provided by a solid light transmissive material with or without optical power or by a deformable membrane capable of exhibiting curvature for definition of a lens surface having optical power. Deformable membrane 12, light transmissive member 18, and optical fluid 16 can define an imaging axis 25. A spacer 9 providing spacing between membrane 12 and light transmissive member 18 can be either of a flexible or non-flexible material. Also in one embodiment, deformable membrane 12, spacer 9, and light transmissive member 18 can be provided by a unitary piece of material. In another embodiment, spacer 9 can be deleted (e.g., membrane 12 and member 18 can be provided to have convex profiles and can be joined together at their respective peripheries). When force is imparted to a deformable surface of lens element 10 by an actuator assembly, an optical characteristic of deformable lens element 10 can change. In one example, a force can be imparted to an external surface 11 of membrane 12. In one embodiment, light transmissive member 18 is light transmissive throughout an entire area thereof. Referring to FIG. 1, FIG. 1 shows deformable membrane 12 in an unstressed state. Referring to FIG. 2, FIG. 2 shows deformable membrane 12 in a stressed state with an actuator assembly of focusing apparatus 100 imparting a force to deformable membrane 12 at positions radially spaced apart from imaging axis 25 to cause a deformable membrane 12 to bulge outward, to change a focal length of lens element 10. Except with regard to components that are otherwise specified focusing apparatus 100 in the various embodiments described can have axial symmetry such that a cross section shown is representative of each radial cross section of focusing apparatus 100.

Figure 3:
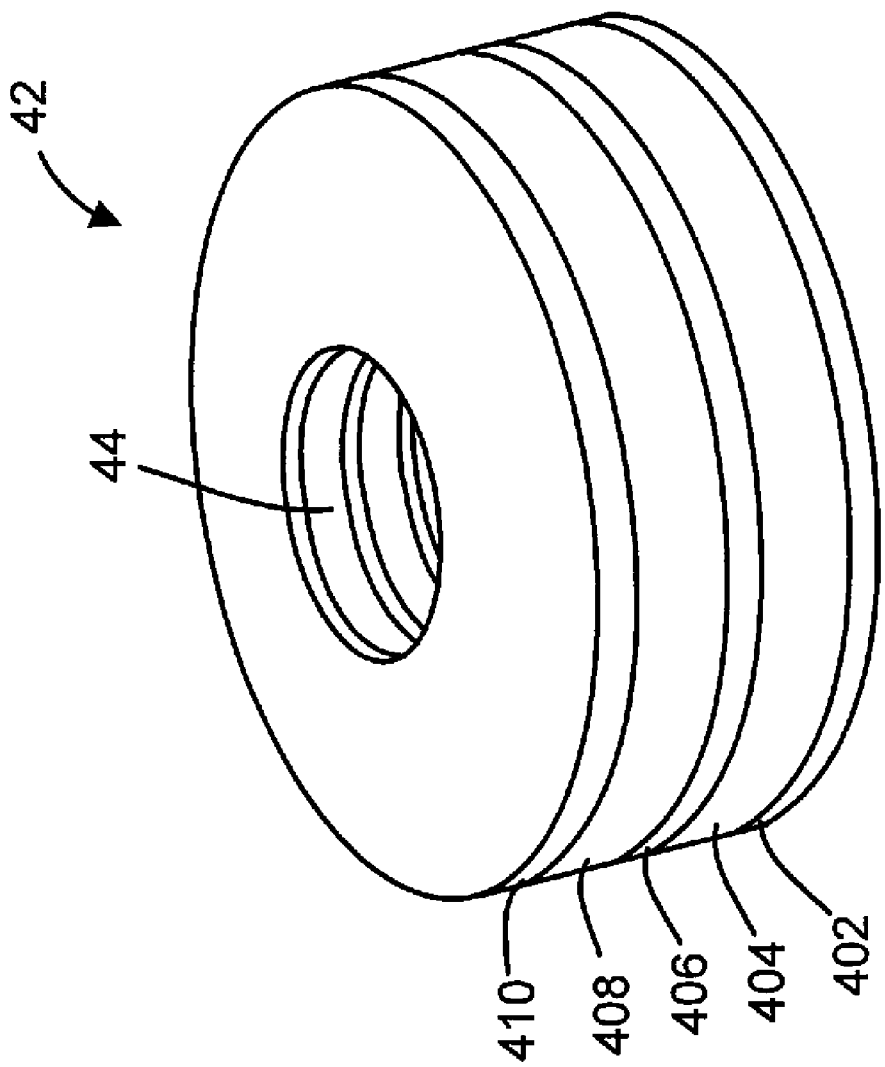
FIG. 3 is a perspective view of a bimorph hollowed disc piezoelectric actuator.

Referring to an actuator assembly of focus apparatus 100, an actuator assembly of focus apparatus 100 in one particular example as shown in FIGS. 1 and 2 can be provided by a piezoelectric actuator 42 as shown in FIGS. 1-3. An exemplary piezoelectric actuator 42 is further described with reference to the perspective view of FIG. 3. Referring to FIG. 3, a bimorphic piezoelectric actuator 42 in a hollowed disc configuration can comprise a first contact 402 serving as a first electrode, a first piezoceramic layer 404, a center metal substrate 406 serving as a middle electrode, and second piezoceramic layer 408 and a second contact layer 410 serving as a second electrode. As shown in FIG. 1-2, piezoelectric actuator 42 can be disposed so that it opposes and is generally in parallel with deformable membrane 12. Application of a voltage to contact layers 402, 406, 410 causes actuator 42 to bend inward as can be seen comparing FIG. 1 ("zero voltage" position where actuator 42 is substantially straight) and FIG. 2 ("positive voltage" position where actuator 42 is bended). When the piezoceramic layer 404 and piezoceramic layer 408 are energized, the layers can contract or expand proportionately to the applied voltage. In a bimorph configuration, a first of the layers 404 or 408 pulls toward a bended configuration and a second of the layers 404 or 408 pushes toward a bended configuration when voltage is applied to the actuator. Shown in parallel bimorph configuration the bimorph piezoelectric actuator 42 of FIGS. 1-3 can also be provided in a two electrode (serial bimorph) configuration. Piezoelectric actuator 42 can also be provided by a unimorph piezoelectric actuator or by a non-piezoelectric actuator such as a polymer muscle type actuator. Shown in the configuration of a disc translator, piezoelectric actuator 42 as shown in FIGS. 1-3 could also be provided in the form of a bar, known as a bar type actuator. Actuator 42 in the embodiment of FIGS. 1-3 can include a center hole 44 to define a ring or other shape configuration and to allow light rays to be transmitted through actuator 42. Selection of a bimorph actuator provides significant advantages, e.g., it was determined that bimorph piezoelectric actuators can yield distance translations per unit of applied voltage several times that of their unimorph counterparts. Examples of hollowed disc piezoelectric actuators that can be incorporated in focusing apparatus 100 include model number CBM/100/15-3/010M available from Piezomechanik GmbH of Munich, Germany.

In the embodiment of FIG. 4, focusing apparatus 100 is provided with additional features allowing focusing apparatus 100 to be finely adjusted and calibrated e.g., during production of focusing apparatus 100 prior to an actuator assembly being activated for movement of lens element 10 for causing change in an optical characteristic of a lens element. Production process described herein (where lens element 10 is positioned in a certain position within focusing apparatus 100 prior to an actuator being activated to change an optical characteristic of lens element 10) can be carried out prior to focusing apparatus 100 being installed and/or used in a terminal such as terminal 1000 or terminal 1000 to be described in greater detail herein.

In the embodiment of FIG. 4, fluid lens element 10 includes a resilient member 54 for providing stabilized positioning of lens element 10 within focusing apparatus 100. As shown in the embodiment of FIG. 4, focusing apparatus 100 can also include light transmissive window 56 and light transmissive window 58 between which fluid lens element 10 can be disposed.

Figure 6:
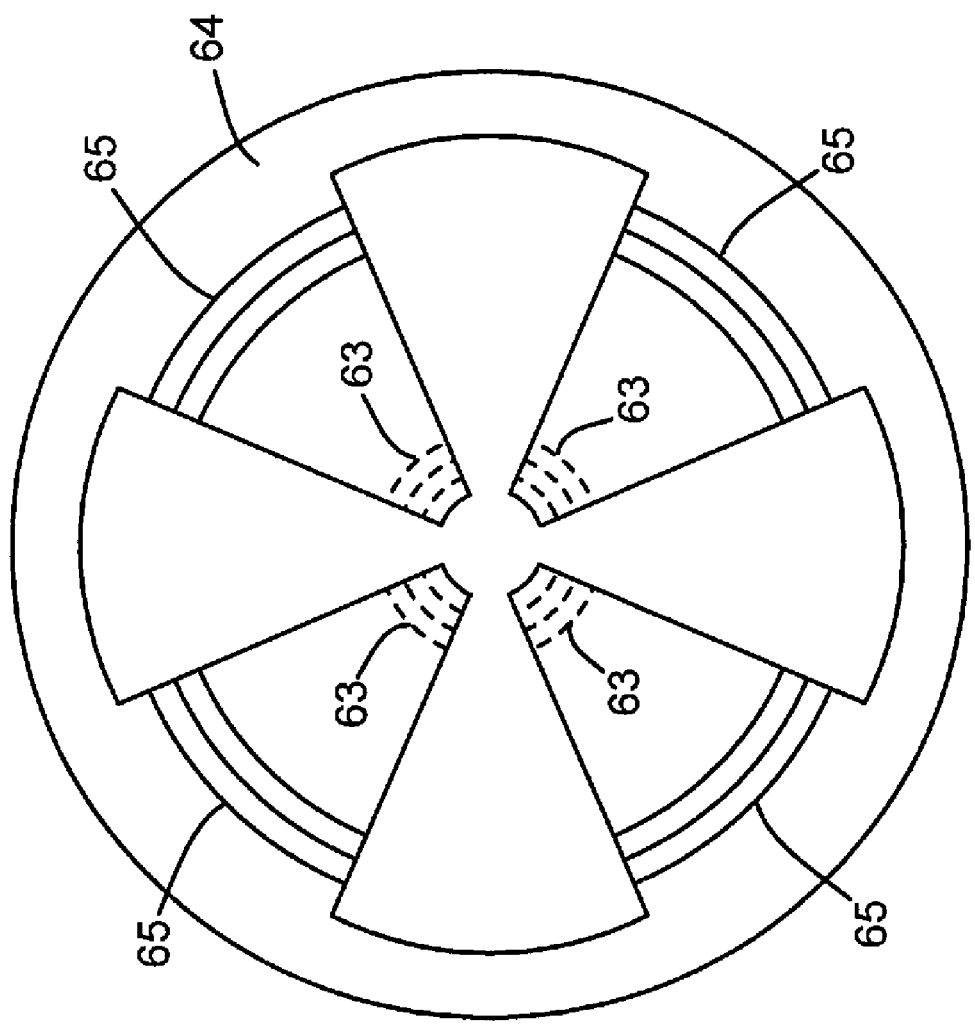
FIG. 6 is a rear view of a focusing apparatus lever ring which is shown in the cross sectional side view of FIG. 5.

Referring to additional features of focusing apparatus 100, focusing apparatus 100 can include a lever ring 64 of which the rear view is shown in FIG. 6. Lever ring 64 can include interior contact points 63 and exterior contact points 65. Interior contact points 63 are more proximate axis 25 than exterior contact points 65. Fulcrum 66 can be included on fulcrum block 67 which in addition to including fulcrum 66 can include threads 80 for threading threads 81 of screw adjusted plug 62. For assembly of focusing apparatus 100, window 56 can be fitted against lip 69 of housing 60. Then piezoelectric actuator 42 can be fitted against window 56 after which lens element 10 with resilient member 54 encircling it can be fitted against piezoelectric actuator 42. After such fitting, window 58 can be fitted against the assembly including lens element 10 and resilient member 54. Then ring 64 can be fitted against window 58. To retain ring 64 along with components 69, 42, 54, 10 and 58 within housing 60, fulcrum block 67 can be fitted as shown to aperture 70 defined by housing 60. Once fitted into aperture 70, fulcrum block 67 can be secured into a secured position with use of set screws 71 which are threaded through holes of housing 60 to contact fulcrum block 67. Screw adjusted plug 62 can then be threaded into fulcrum block 67. Also, a function of set screws 71 can be provided by providing threads of an outer diameter of fulcrum block 67 and an inner diameter of housing 60 and threading in the fulcrum block 67 into housing 60. Fulcrum block 67 can be held in place with friction forces which forces can optionally be enhanced e.g., with use of a locking nut added to the end of fulcrum block 67, or with use of a thread lock adhesive. The various components of focusing apparatus 100 can be secured in a secure and stable position by friction forces. Such friction forces can be enhanced, e.g., with use of adhesives or by laser welding. Focusing apparatus 100 can be configured so that lever ring 64 pivots on fulcrum 66 so that contact points 65 of lever ring 64 impart a pushing force on light transmissive window 58. Lever ring 64 can respond to a rotational force provided by rotation of screw-adjusted plug 62. With lever ring 64, a rotation of screw adjusted plug 62 can be translated into a precision axially directed force imparted by lever ring 64 onto light transmissive window 58 for precision adjustment of a width of pocket, P, defined by members of focusing apparatus 100 that contact a first surface and a second surface of fluid lens element 10.

It was determined that problems exist with respect to manufacture of focusing apparatuses so that each of several manufactured focusing apparatuses behaves similarly. With small dimensions being desirable for packaging and cost reasons (an exemplary width of a focusing apparatus is 0.6 mm or smaller) manufacturing tolerances become an important factor for consideration. It is especially difficult to manufacture micron-sized subcombinations within fine tolerances. Accordingly, for lowered costs, it can be beneficial to utilize subcomponents not manufactured to fine tolerances and which, as a result of not being manufactured to fine tolerances vary in size or shape from component to component.

One specific problem associated with the challenge to manufacture a set of focusing apparatuses is that, due to manufacturing tolerances, both an unstressed thickness, t, of lens element (having thickness that can be determined by the sum of thicknesses of membrane 12, light transmissive member 18, and spacer 9) as well as a baseline width, W, of a pocket, P, defined by members retaining lens element 10 in the horizontal dimension can vary from production run to production run. (In the example of FIG. 4 where adjustment of features are included, a width, W, of pocket, P, is adjustable during production, however, without such adjustment features, a width, W, of pocket, P, would be fixed.) Accordingly, because of manufacturing tolerances, lens element 10 might be fitted too loosely in its holding pocket such as pocket, P, or alternatively too snugly within its destined pocket, P. In the example of FIG. 4, pocket P is defined by piezoelectric actuator 42 and light transmissive window 58. However, it will be understood that a same functioning pocket could also be provided by an alternate set of members.

In determining the design of the focusing apparatus as shown in FIG. 4, it was noted that larger manufacturing tolerances of component parts are normally advantageous for cost saving purposes. For facilitating use of components having higher manufacturing tolerances, focusing apparatus 100 can be provided so that a width of pocket, P, can be finely adjusted during manufacture of focusing apparatus 100. In such manner, the width, W, of pocket, P, in relation to a thickness, t, (unstressed) of fluid lens element 10 can be finely adjusted, so that consistency of performance between various focusing apparatuses produced during various production runs can be achieved. For achieving consistency of performance of focusing apparatuses that are produced, each focusing apparatus 100 can be adjusted during manufacture so that a positioning relationship of predetermined criteria between lens element 10 and pocket defining members of focusing apparatus 100 is achieved during manufacture of each focusing apparatus 100.

Referring to fine adjustment features of focusing apparatus 100, focusing apparatus 100 can include a resilient member 54, which like fluid lens element 10 and can be interposed between members (members 42 and 58 in the described example) of focusing apparatus 100 that define pocket, P, of focusing apparatus 100. In another aspect, resilient member 54 can be generally ring shaped so that when it is disposed about the periphery of fluid lens element 10, resilient member 54 retains fluid lens element 10. Resilient member 54 can be configured to have a closed periphery. Resilient member 54 can be configured so that its inner profile is closely correlated to an outer profile of fluid lens element 10. Resilient member 54 can be configured so that it is deformably resilient in the horizontal dimension. Also, in a further aspect, resilient member 54 can be configured so that resilient member 54 includes an unstressed thickness of greater than a maximum expected unstressed thickness (in view of manufacturing tolerances) of fluid lens element 10.

In yet another aspect, resilient member 54 can be configured to impart a resistive force greater than a resistive force of fluid lens element 10. Configured as described, fluid lens resilient member 54 allows fluid lens element 10 to be positioned in pocket, P, in such manner that a surface of an actuator assembly in a baseline position (e.g., zero voltage) of focusing apparatus 100 is in minimal contacting relationship with fluid lens element 10 without imparting substantial force on the lens element 10.

For achieving consistent performance of fluid lens element 10, a width, W, of pocket, P, can be adjusted for each focusing apparatus 100 manufactured so that the described minimally contacting position of lens element 10 is achieved prior to use of focusing apparatus 100 in terminal 1000 or terminal 2000 as will be described herein and prior to application of voltage to piezoelectric actuator 42. The position of piezoelectric actuator 42 prior to application of voltage thereto can be regarded as a "zero position" of piezoelectric actuator 42.

In one embodiment, deformable membrane 12 can be substantially planar in an unstressed state and piezoelectric actuator 42 can also be substantially planar in a zero voltage state and a minimally contacting relationship is achieved by adjusting focusing apparatus 100 to move the planar members toward one another until they contact one another and then stopping the adjustment process at the time the contact is achieved. Contact between lens element 10 and pocket defining members of focusing apparatus 100 can be monitored by monitoring a focal length of fluid lens element 10. In general, a focal length of fluid lens element 10 will remain constant and then change at the time it is contacted. In one embodiment, a minimally contacting position can be determined to be achieved when lens element 10 with zero voltage applied to an actuator assembly exhibits a predetermined focal length within a predetermined tolerance. In one example, if the desired minimal zero voltage state corresponds to zero optical power (i.e., 0.0 Diopter), then a tolerance of ±0.01 Diopters might be acceptable. In some embodiments, zero voltage states can have corresponding optical powers other than zero and thus other tolerances might be acceptable.

In one embodiment, resilient member 54 can be provided by a metallic leaf spring. In another embodiment, resilient member 54 can be provided by an elastomeric gasket. A schematic representation of resilient member 54 in combination with lens element 10 is shown in FIG. 5. In an unstressed state as shown in FIG. 4, resilient member 54 can have a thickness greater than a thickness of fluid lens element 10. In another aspect of resilient member 54 an interior profile of resilient member 54 can be closely correlated to an outer profile of fluid lens element 10 so that resilient member 54 is operative to retain a shape of the outer circumference of fluid lens element 54.

For fine adjustment of a width, W, of pocket, P, so that a minimally contacting position is achieved, plug 62 can be rotated. Forces imparted by rotation of plug 62 are translated into finely controlled axially directed forces imparted by ring 64 onto light transmissive window 58. When a positioning relationship of predetermined criteria is achieved between fluid lens element 10 and members of focusing apparatus 100 defining pocket, P, is achieved (such as a minimally contacting position between an actuator assembly and fluid lens element 10), the width, W, of pocket, P, can be fixed e.g., by application of thread lock adhesives or by laser welding or with use of a locking nut. Alternatively, friction forces can be relied upon for maintaining a desired threading distance of screw plug 62 and therefore a desired positional relationship between fluid lens element 10 and pocket defining members that define pocket, P. The determination that a certain relative position of lens element 10 and an actuator assembly can be made, e.g., by human observation of the certain position, by human observation of a test pattern projected or subject to image capture or machine processing of a test pattern subject to image capture and/or by measurement of a focal length of lens element 10.

The embodiment of FIGS. 1 and 3 and of FIG. 4 piezoelectric actuator 42 in the configuration of a hollowed disc can be provided in the particular configuration of a ring having a center hole 44 of circular shape from a top view. Other configurations for hollowed disc piezoelectric actuator 42 can be provided.

Figure 8:
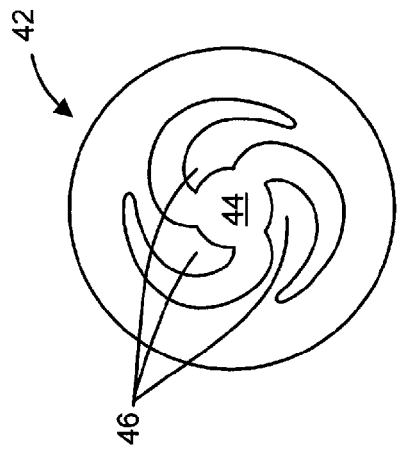
FIG. 8 is a top view of a hollowed disc piezoelectric actuator in another embodiment.
Figure 7:
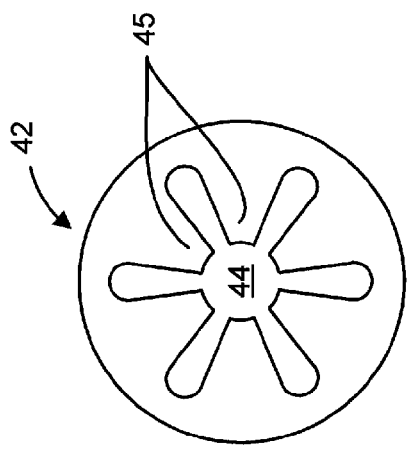
FIG. 7 is a top view of a hollowed disc piezoelectric actuator in another embodiment.

As best seen in FIG. 7, hollowed bore 44 of piezoelectric actuator 42 can be of such configuration that piezoelectric actuator 42 defines a plurality of frustro-triangular tabs 45. Referring to FIG. 8, in an alternative embodiment hollowed bore 44 can be of such configuration that piezoelectric actuator 42 defines elongated curvilinear tabs 46. The provisioning of piezoelectric actuator 42 so that the piezoelectric actuator 42 includes tabs such as tabs 45 or tabs 46, configures piezoelectric actuator 42 so that increased bending of piezoelectric actuator 42 in a direction parallel with axis 25 is provided in response in application of a baseline voltage to piezoelectric actuator 42. With reference to the piezoelectric actuator 42 as shown in FIGS. 7-8, the actuators of FIGS. 7-8 can be bimorph configuration piezoelectric actuators having side view profiles as shown in the embodiment of actuator 42 of FIGS. 1 and 3. A focusing apparatus 100 incorporating an actuator as shown in FIG. 7 or 8 can be operative so that piezoelectric actuator 42 directly imparts a force to fluid lens element 10. Alternatively, piezoelectric actuator 42 can be operative to translate a force to another element, e.g., a push ring as described herein, which imparts force to fluid lens element 10.

As described with reference to the embodiment of focusing apparatus 100 set forth with reference to FIGS. 1-3, and also with reference to the embodiment of FIG. 4, an actuator assembly for impartation of force to deformable membrane 12 can be provided by a piezoelectric actuator. However, in an alternative embodiment, an actuator assembly for application of force to deformable membrane 12 can include additional structural members and/or features in addition to an actuator.

Figure 9:
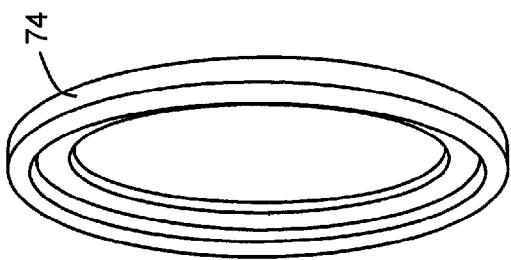
FIG. 9 is a perspective view of a push ring that can be incorporated in an actuator assembly.
Figure 10:
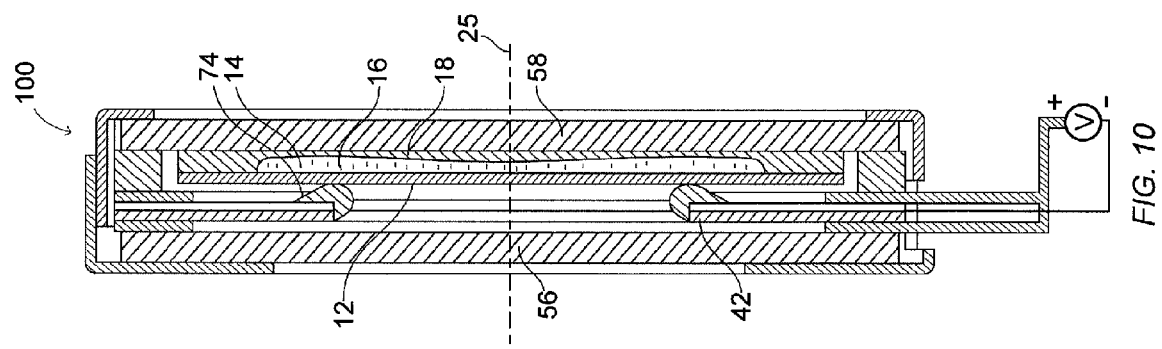
FIG. 10 is a cutaway side view of an actuator assembly.

In the embodiment described with reference to FIGS. 9 and 10, a push ring 74 is provided in association with piezoelectric actuator 42 so that an actuator assembly of focusing apparatus 100 includes actuator 42 in combination with push ring 74. Push ring 74 can be provided so as to increase the uniformity and consistency of forces that are imparted to deformable membrane 12. In the embodiment of FIG. 10, hollowed disc piezoelectric actuator 42 is shown as being provided by a bimorph piezoelectric actuator in a parallel configuration.

Figure 12:
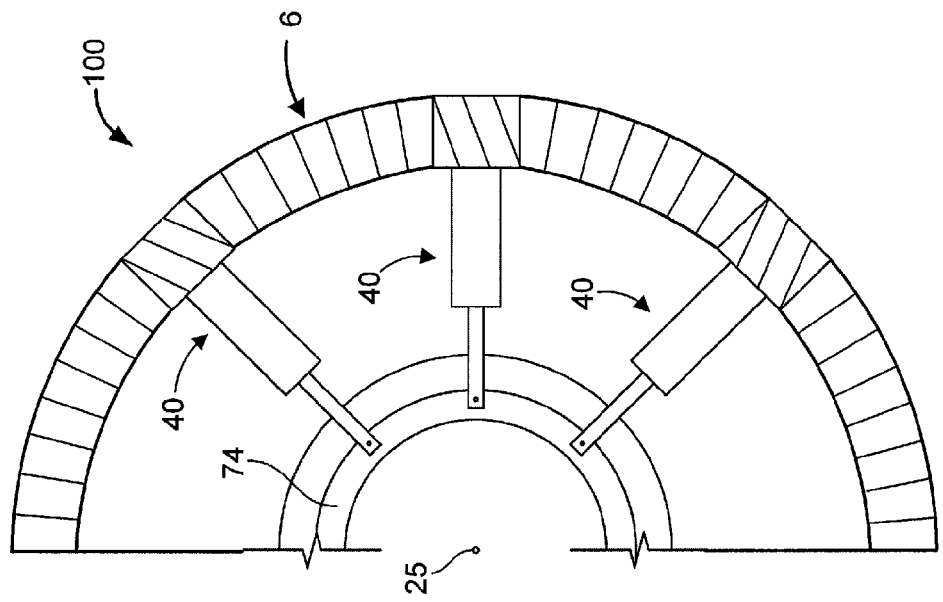
FIG. 12 is a front view of the focusing apparatus as shown in FIG. 11.
Figure 11:
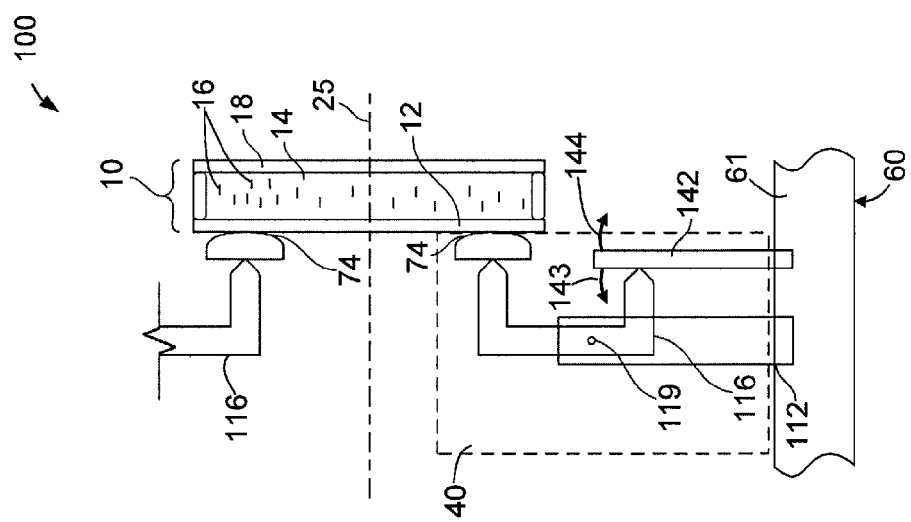
FIG. 11 is a side schematic view of an actuator assembly in an embodiment which includes a bar type piezoelectric actuator.

Referring now to FIGS. 11 and 12, an embodiment of focusing apparatus 100 is described wherein an actuator assembly 40 for imparting a force on deformable membrane 12 includes a plurality of members. In the embodiment set forth such plurality of members can include bar type piezoelectric actuator 142, pivoting member 116, stationary member 112, pivot point 114, and push ring 74. Pivoting member 116 is arranged on pivot point 114 of stationary member 112 so that pivoting member 116 can pivot in relation to stationary member 112. Bar type actuator 142 can be unimorphic or bimorphic. Stationary member 112 can be stabilized on housing 60 of focusing apparatus 100. As seen in the described example, stationary member 112 can be fixedly secured to (e.g., by welding, integrally forming) a wall 61 of housing 60. Likewise, bar type piezoelectric actuator 142 can be supported by housing 61. In a zero voltage position (zero voltage applied) bar type piezoelectric actuator 142 can be in the position as shown in FIG. 11. Focusing apparatus 100 can be arranged so that with positive voltage applied to actuator 142, actuator 142 bends in the direction of arrow 143 and with negative voltage applied bends in the direction of arrow 144. Examples of bar type piezoelectric actuators that can be incorporated into focusing apparatus 100 include model numbers B300/08/010 available from Piezomechanik GmbH.

Referring to operation of actuator 40 as shown in FIG. 11, a voltage can be applied to piezoelectric actuator 142 so that forces imparted to pivoting member 116 cause pivoting of pivoting member 116. When pivoting member 116 pivots, pivoting member 116 imparts a force in the general direction of axis 25 onto push ring 74 causing push ring 74 to impart a force in the general direction of axis 25 to cause deformable membrane 12 to become more convex at a central area thereof. As seen in the front view of focusing apparatus 100, as shown in FIG. 12, several actuator assemblies 40 can be disposed at radially spaced positions so that push ring 74 is provided with force by a pivoting member 116 at a plurality of radially spaced positions.

Figure 14:
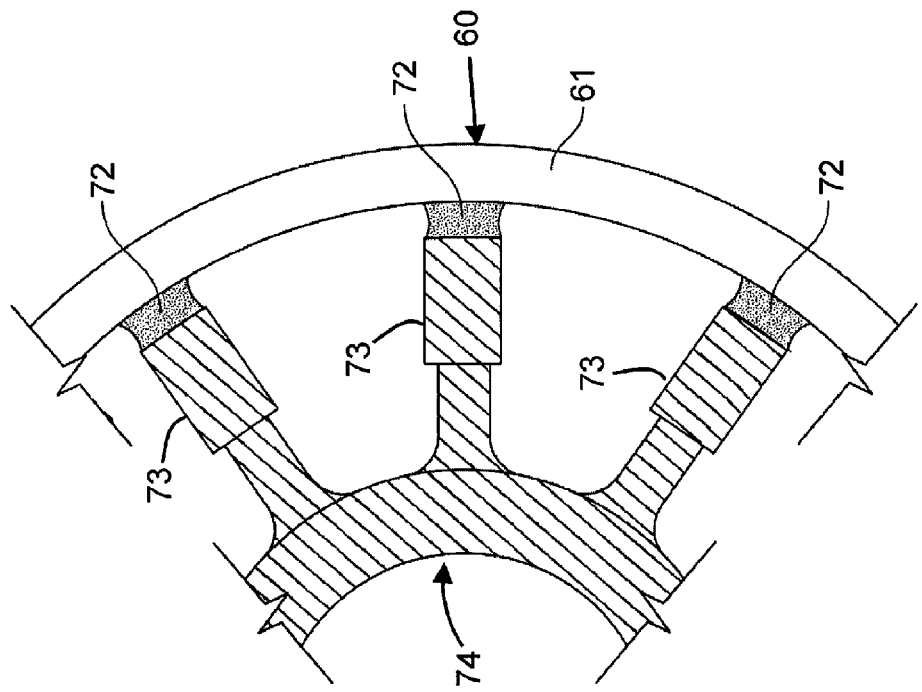
FIG. 14 is a partial bottom view of the focusing apparatus as shown in FIG. 13 taken along the line A-A of FIG. 13.

Referring now to the embodiment of focusing apparatus 100 described with reference to FIGS. 13 and 14, actuator assembly 40 for imparting a force on deformable membrane 12 can include push ring 74 in combination with linear piezoelectric actuator 242 which in the embodiment shown is arranged generally in parallel with imaging axis 25. Linear piezoelectric actuator 242 is operative so that when positive voltage is applied to linear piezoelectric actuator 242, a thickness of linear piezoelectric actuator 242 can increase between a first thickness t, (a zero position), and a second thickness $t_2$ (a positive voltage position). Referring to aspects of push ring 74, push ring 74 can include contact surface 73 that contacts piezoelectric actuator 242. In a further aspect, push ring 74 can be adapted so that push ring 74 is supported by to housing 60. In one embodiment, push ring 74 can be integrally formed with housing 60. In the embodiment of FIG. 14, push ring 74 is supported by walls 61 of housing 60. In yet another aspect, push ring 74 can be arranged so that it is normally biased so that push ring 74 imparts a compression force onto deformable membrane 12. In such manner, a voltage applied to piezoelectric actuator 242 will move push ring 74 away from its normal position at which push ring 74 compresses deformable membrane 12. In such manner a voltage applied to piezoelectric actuator 242 so that push ring 74 is moved away from its normally biased position results in deformable membrane 12 becoming less convex. In the described example, push ring 74 includes connection bridges 72 as shown in FIG. 14 connecting push ring 74 to housing wall 61. Connection bridges 72 can be integrally formed with push ring 74 and wall 61 of housing 60. Bridges 72 serve as pivot points for push ring 74 in the described example. Examples of linear piezoelectric actuators that can be incorporated into focusing apparatus 100 include a model number P-820 PRE-LOADED PIEZO ACTUATOR available from Physik Instruments, GmbH.

Figure 13:
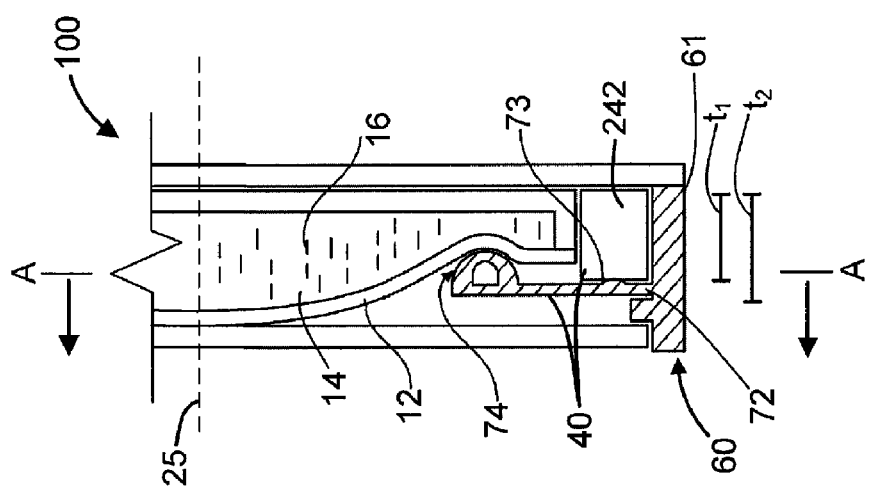
FIG. 13 is a cutaway side view of a focusing apparatus including a linear piezoelectric actuator operatively disposed to impart a force on a push ring that is fixedly secured to a housing which is normally biased to impart a compression force to a deformable membrane.

Referring to FIG. 14, FIG. 14 shows a cutaway front view of the focusing apparatus 100 as shown in FIG. 13. As seen in the view of FIG. 14, push ring 74 can include a plurality of contact points 73. Focusing apparatus 100 can be operative so that a plurality of piezoelectric actuators 242 can be disposed in focus apparatus 100 so that a different linear piezoelectric actuator 242 contacts a contact point 73 at a plurality of radially spaced positions as are indicated in FIG. 14.

As in the embodiment of FIGS. 1-14, actuator assembly 40 can be adapted to contact deformable membrane 12 at a plurality of positions about a periphery of deformable membrane 12. The plurality of contact positions can be defined peripherally about and spaced apart from axis 25 of lens element 10. Focusing apparatus 100 can be adapted so that an optical property of deformable lens element 10 is varied by applying a force generally in a direction of axis 25 at a plurality of contact points on deformable membrane 12 defined peripherally about axis 25.

Regarding the embodiments of FIGS. 11-12 and 13-14, the embodiments of FIGS. 11-12 and FIGS. 13-14 illustrate that actuator assemblies 40 can be provided for moving of lens element 10 which translate smaller ranges of motion (i.e., distance translations) into larger ranges of motion. In the examples set forth herein, a lever is provided to multiply the translation (range of motion) provided by an actuator (in the example of FIGS. 11-12, a bar type piezoelectric actuator and in the example of FIGS. 13-14 a linear piezoelectric actuator). Such actuator assemblies may be particularly advantageous for applications where for cost or other considerations an actuator having a limited range of motion is selected.

Regarding deformable membrane 12, the deformable membrane can comprise nonporous optically clear elastomer material. A suitable material for use as membrane 12 is SYLGARD 184 Silicon elastomer, of the type available from DOW CORNING.

Regarding cavity 14 described in the various embodiments, cavity 14 can be filled with optically clear focus fluid. Selecting a focus fluid with a relatively high index of refraction will reduce the amount of deformation needed to obtain a given change in focal distance. In one example, a suitable index of refraction would be in the range of from about 1.3 to about 1.7. Selecting a focus fluid with a smaller index of refraction is advantageous where it is desired to increase the amount of deformation needed to obtain a given change in focal distance. For example, in some embodiments where a selected actuator assembly 40 generates relatively coarse movements, a focus fluid having a lower index of refraction might be selected. One example of a suitable focus fluid (optical fluid) is SL-5267 OPTICAL FLUID, available from SANTOLIGHT, refractive index=1.67.

Force can be imparted to a deformable surface of a deformable lens element at a plurality of force impartation points having characteristics that vary depending on the shape of the force imparting structural element. Where the force imparting element is ring shaped (e.g., where the actuator assembly includes a ring shaped push ring for imparting force, or where the actuator assembly is devoid of a push ring but includes a ring shaped actuator arranged to directly contact and impart force to membrane 12), a plurality of force impartation points can be formed in a ring pattern about axis 25. Ring shaped force imparting elements as described herein have been shown as being circular; however, ring shaped force applying elements can also be non-circular as shown in FIGS. 7 and 8 (where an piezoelectric actuator 42 is operative to directly impart a force to fluid lens element 10). In addition to the geometries shown in FIGS. 7 and 8, ring shaped force applying elements can be oval, asymmetrically arcuate, or polygonal. Where a force imparting element is ring shaped, force imparting points of a deformable surface, at least a part of which transmits image forming light rays, do not include points within a two dimensional area about axis 25 delimited by the plurality of force imparting points in a ring pattern peripherally disposed about axis 25.

Figure 16:
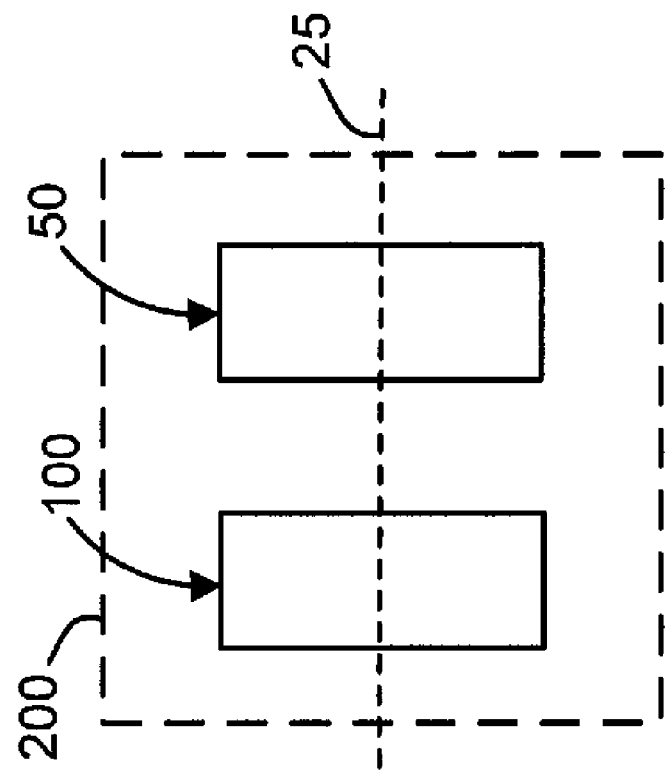
FIG. 16 is an embodiment of a variable lens assembly having a focusing apparatus and an additional optical element in series with the focusing apparatus.
Figure 15:
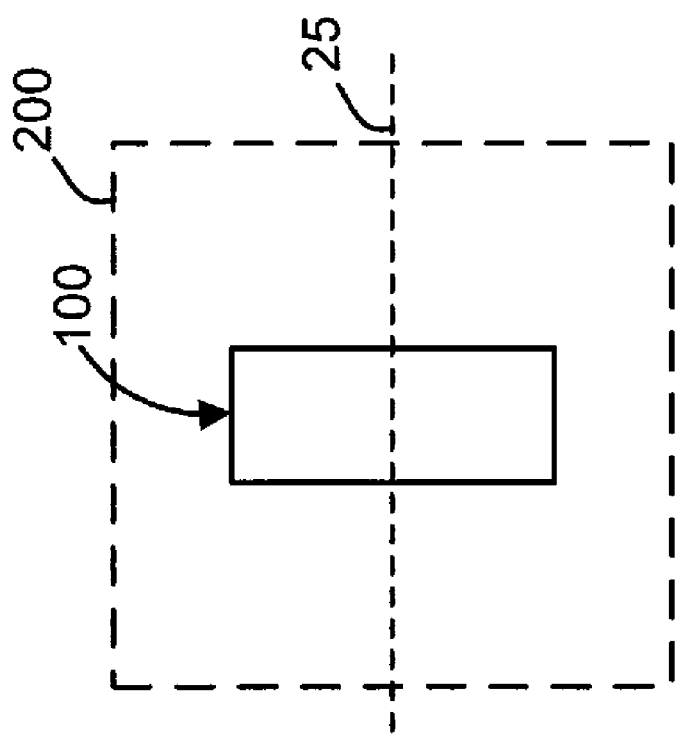
FIG. 15 is an embodiment of a variable lens assembly having a focusing apparatus.

Focusing apparatus 100 can be employed alone or in combination with other optical elements to define a lens assembly 200. Variations of lens assembly 200 comprising focusing apparatus 100 are shown in FIGS. 15 and 16. In the embodiment of FIG. 15, lens assembly 200 comprises focusing apparatus 100. In the embodiment of FIG. 16, lens assembly 200 comprises focusing apparatus 100 and additional optical element 50. Additional optical element 50 can comprise, e.g., a focusing apparatus including a deformable fluid lens element, a focusing apparatus including an electrowetting fluid lens element, or a traditional non-deformable solid (e.g., glass, polycarbonate) lens element. In another embodiment, lens assembly 200 can comprise a plurality of additional optical elements.

Figure 17:
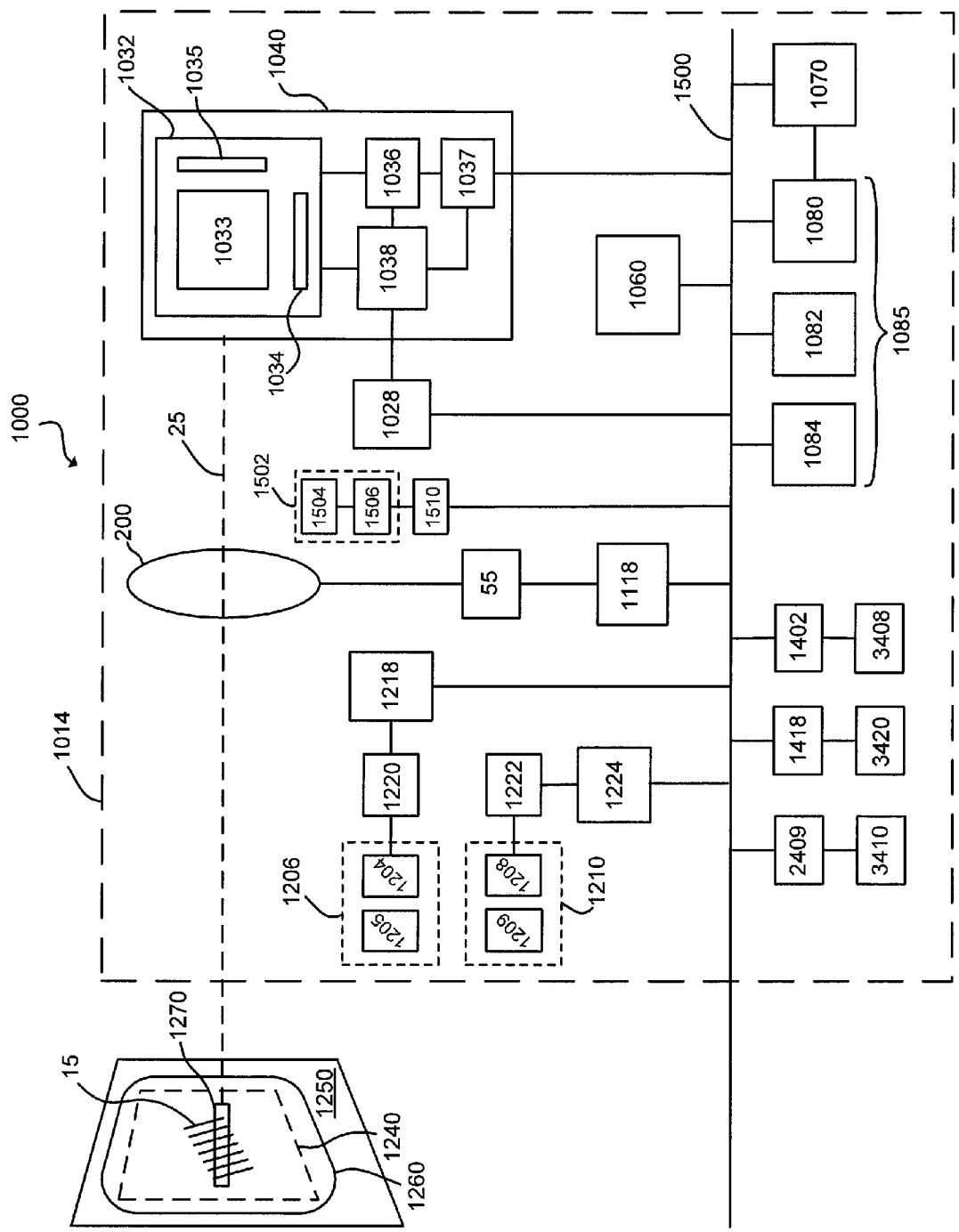
FIG. 17 is a block diagram of an image sensor based indicia reading terminal having a variable lens assembly.

In FIG. 17 there is shown a lens assembly 200 including lens element 10 disposed in an image sensor based indicia reading terminal 1000.

Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., the exposure period of image sensor 1032, gain applied to the amplifier 1036. The noted circuit components 1032, 1036, 1037, and 1038 can be packaged into a common image sensor integrated circuit 1040. In one example, image sensor integrated circuit 1040 can be provided by an MT9V022 image sensor integrated circuit available from Micron Technology, Inc. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data.

In the course of operation of terminal 1000 image signals can be read out of image sensor 1032, converted and stored into a system memory such as RAM 1080. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Referring to further aspects of terminal 1000, lens assembly 200 can be adapted for focusing an image of a decodable indicia 15 located within a field of view 1240 on a substrate 1250 onto image sensor array 1033. Imaging light rays can be transmitted about imaging axis 25. Lens assembly 200 can be adapted to be capable of multiple focal lengths and multiple best focus distances.

Terminal 1000 can also include an illumination pattern light source bank 1204 and associated light shaping optics 1205 for generating an illumination pattern 1260 substantially corresponding to a field of view 1240 of terminal 1000. The combination of bank 1204 and optics 1205 can be regarded as an illumination pattern generator 1206. Terminal 1000 can also include an aiming pattern light source bank 1208 and associated light shaping optics 1209 for generating an aiming pattern 1270 on substrate 1250. The combination of bank 1208 and optics 1209 can be regarded as an aiming pattern generator 1210. In use, terminal 1000 can be oriented by an operator with respect to a substrate 1250 bearing decodable indicia 15 in such manner that aiming pattern 1270 is projected on a decodable indicia 15. In the example of FIG. 15, decodable indicia 15 is provided by a 1D bar code symbol.

Decodable indicia 15 could also be provided by a 2D bar code symbol or optical character recognition (OCR) characters. Each of illumination pattern light source bank 1204 and aiming pattern light source bank 1208 can include one or more light sources. Lens assembly 200 can be controlled with use of electrical power input unit 55 which provides energy for changing a plane of optimal focus of lens assembly 200. In one embodiment, an electrical power input unit 55 can operate as a controlled voltage source, and in another embodiment, as a controlled current source. Illumination pattern light source bank 1204 can be controlled with use of illumination pattern light source control circuit 1220. Aiming pattern light source bank 1208 can be controlled with use of aiming pattern light source bank control circuit 1222. Electrical power input unit 55 can apply signals for changing optical characteristics of lens assembly 200, e.g., for changing a focal length and/or a best focus distance of (a plane of optimum focus of) lens assembly 200. Illumination pattern light source bank control circuit 1220 can send signals to illumination pattern light source bank 1204, e.g., for changing a level of illumination output by illumination pattern light source bank 1204. Aiming pattern light source bank control circuit 1222 can send signals to aiming pattern light source bank 1208, e.g., for changing a lumen of illumination output by aiming pattern light source bank 1208.

Terminal 1000 can also include a number of peripheral devices including trigger 3408 which may be used to make active a trigger signal for activating frame readout and/or certain decoding processes. Terminal 1000 can be adapted so that activation of trigger 3408 activates a trigger signal and initiates a decode attempt. Specifically, terminal 1000 can be operative so that in response to activation of a trigger signal, a succession of frames can be read out and captured by way of read out of image information from image sensor array 1033 (typically in the form of analog signals) and then storage of the image information after conversion into memory 1080 (which can buffer one or more of the succession of frames at a given time). CPU 1060 can be operational to subject one or more of the succession of frames to a decode attempt. For attempting to decode a bar code symbol, CPU 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1118 for coupling electrical power input unit 55 to system bus 1500, interface circuit 1218 for coupling illumination light source bank control circuit 1220 to system bus 1500, interface circuit 1224 for coupling aiming light source bank control circuit 1222 to system bus 1500, and interface circuit 1402 for coupling trigger 3408 to system bus 1500. Terminal 1000 can also include a display 3420 coupled to system bus 1500 and in communication with CPU 1060, via interface 1418, as well as pointer mechanism 3410 in communication with CPU 1060 via interface 2409 connected to system bus 1500.

A succession of frames of image data that can be captured and subject to the described processing can be full frames (including pixel values corresponding to more than about 80% of pixels of image sensor 1032). A succession of frames of image data that can be captured and subject to the described processing (e.g., frame quality evaluation processing) can also be "windowed frames" comprising pixel values corresponding to less than about 80%, and in some cases less than about 50% and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

In another aspect, terminal 1000 can include a temperature sensing assembly 1502 including a temperature sensor 1504 and an analog to digital converter 1506 for sensing a temperature of fluid containing lens element 10 of lens assembly 200. Temperature sensor 1504 can be disposed at or in proximity with fluid containing lens element 10 of lens assembly 200. CPU 1060 can be in communication with temperature sensor 1504 via interface 1510 coupled to assembly 1502 and system bus 1500.

Further regarding terminal 1000, an electrical power input applied by electrical power input unit 55 for establishing a desired lens setting can be responsive to a temperature sensed by sensor 1504. It has been mentioned that at higher temperatures a lens membrane and/or lens fluid can expand to result in changes in optical characteristics of the lens element. To compensate for the lens element characteristic changes resulting from thermal expansion, an electrical power input, applied by an electrical power input unit of electrical power input unit 55 for establishing a lens setting of lens assembly 200 can be varied.

Figures 18, 19:
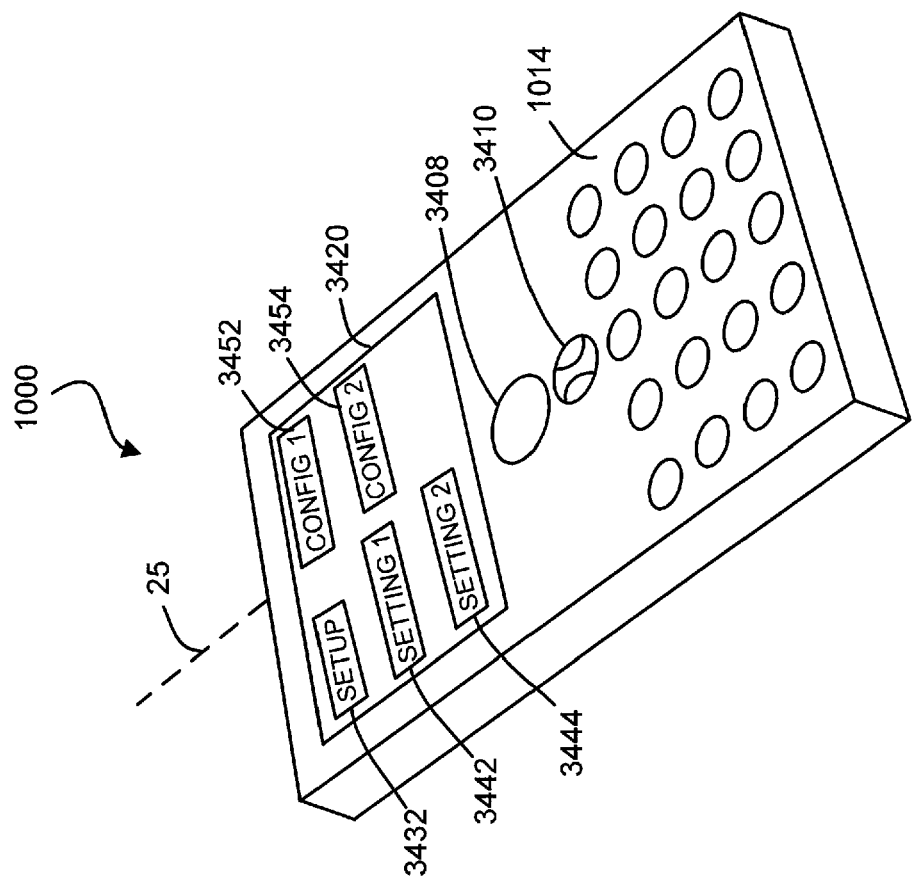
FIG. 18 is a perspective view of an indicia reading terminal having a hand held housing.
FIG. 19 illustrates a table for control of an indicia reading terminal.

A physical form view of terminal 1000 in one embodiment is shown in FIG. 18. Display 3420, trigger 3408, and pointer mechanism 3410 can be disposed on a common side of a hand held housing 1014 as shown in FIG. 18. Display 3420 and pointer mechanism 3410 in combination can be regarded as a user interface of terminal 1000. A user interface of terminal 1000 can also be provided by configuring terminal 1000 to be operative to be reprogrammed by decoding of programming bar code symbols. A hand held housing 1014 for terminal 1000 can in another embodiment be devoid of a display and can be in a gun style form factor.

In another aspect, terminal 1000 can be operated in a set up mode selectable, e.g., by selection of button 3432 using a user interface of terminal 1000. The setup mode can be activated for determining power inputs corresponding to various lens assembly settings. In a setup mode, terminal 1000 can be operated at various temperatures and electrical power input can be varied until a desired reference lens setting is achieved. Terminal 1000 in one embodiment can be operative so that a setup mode can be activated by an end user operator of terminal 1000. In another embodiment, terminal 1000 can be operative so that the setup is restricted from being activated by an operator user and can only be activated by a manufacturer provider user. In one embodiment, terminal 1000 can be operative so that a setup mode can be activated prior to the incorporation of terminal components into housing 1014. Repeating the process for several settings and sensed temperatures a control table 3490 as shown in FIG. 19 can be established. Once table 3490 is established, the setup mode can be deactivated by de-selection of button 3432 and operated in a run mode. In a run mode, terminal 1000 can operate according to a selected first or second configuration as described herein or according to another configuration. For establishing a certain (e.g., selected) lens setting when operating in run mode, terminal 1000 can utilize table 3490 correlating temperatures and settings to required power input for determining a power input level for establishing a certain lens setting.

Referring to terminal 1000, terminal 1000 can be operative to move a lens setting of lens assembly 200 between at least a first plane of optimum focus setting and a second plane of optimum focus setting. Indicia reading terminal 1000 can be operative to move a lens setting of the lens assembly between at least first and second different planes of optimum focus settings, and can further be operative to expose a first frame of image data with the lens assembly at the first plane of optimum focus setting and a second frame of image data with the lens assembly at the second plane of optimum focus setting, and the terminal can further be configured so that the terminal is operative to subject each of the first and second frames of image data to a decode attempt for decoding of a decodable indicia. The second frame can be a successive frame in relation to the first frame or a non-successive subsequent frame in relation to the first frame.

Terminal 1000 can be operative so that terminal 1000, when an operator activated read attempt is actuated by actuation of trigger 3408, can capture a succession of frames and subject one or more of the frames to a decode attempt until a time that the operator activated read attempt is deactivated, e.g., by release of trigger 3408 or a successful decode or a timeout condition being satisfied. In another aspect, terminal 1000 in a first operator activated configuration set forth herein can be operative to move a lens setting of the lens assembly between at least the first and the second lens settings of the lens assembly during a time that the terminal executes an operator activated read attempt of the terminal. Further, the terminal be operative so that first and second frames utilized for a decode attempt are frames exposed during a single operator activated read attempt of the terminal.

Terminal 1000 in a second operator activated configuration set forth herein can be operative to maintain a lens setting of the terminal at a certain lens setting during a time that the terminal executes an operator activated read attempt of the terminal. In addition, terminal 1000 can be operative to move a lens setting in accordance with an operator input command input subsequent to a first operator activated read attempt and prior to a second operator activated read attempt. Terminal 1000 can be further operative so that a first frame and a second frame utilized for a decode attempt are frames exposed during separate first and second separate operator activated read attempts of the terminal.

Terminal 1000 can have a user interface comprising a display 3420 and pointer mechanism 3410, and a user can utilize the user interface to select a lens setting by selection of a displayed button 3442, 3444 corresponding to the desired lens setting. Terminal 1000 can further be operative so that when trigger 3408 is active and to activate a read attempt, terminal 1000 maintains the lens setting at the selected lens setting through the capture of a plurality of frames, including the first and second frames when attempting to decode a decodable indicia in response to a trigger signal being made active to initiate a decode attempt with use of trigger 3408. An operator can select between a first configuration (lens setting moves during read attempts) and second configuration (lens setting is maintained through read attempts) using the user interface of terminal 1000 by selection of a button 3452 (first configuration, moving lens), or button 3454 (second configuration, fixed setting lens), corresponding to the desired configuration.

Further aspects of terminal 1000 in one embodiment are described with reference to the timing diagram of FIG. 20. The timing diagram of FIG. 20 illustrates terminal 1000 undergoing a change in configuration from a first configuration in which a variable lens of terminal 1000 is varied during a read attempt to a second configuration in which a variable lens of terminal 1000 remains at a fixed setting throughout a read attempt.

Figure 20:
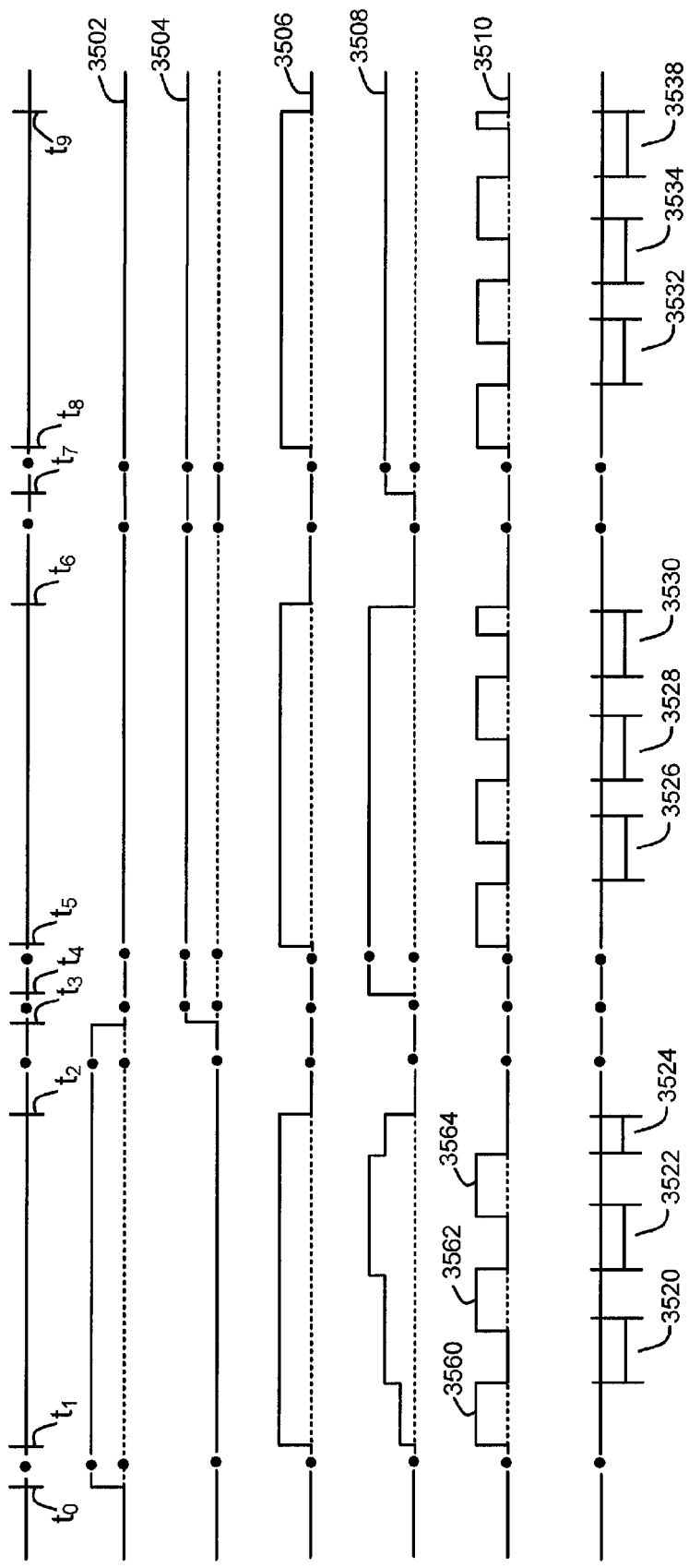
FIG. 20 is a timing diagram illustrating operational aspects of an indicia reading terminal.

Referring to the timing diagram of FIG. 20, signal 3502 is a state signal representing an active or inactive state of the first user selectable configuration. Signal 3504 is a state signal representing the state of a second described user selectable configuration. Signal 3506 is a trigger signal which can be made active by actuation of trigger 3408, and which can be deactivated by releasing of trigger 3408 which may become inactive after a time out period or after a successful decode of a decodable indicia. Signal 3508 represents an energy input level input into lens assembly 200 of terminal 1000. Signal 3510 is an exposure control signal. The exposure control signal transitions from active to inactive states. Exposure periods of terminal 1000 are represented by the active state periods of signal 3510.

Referring to processing periods 3520, 3522, 3524, 3526, 3528, 3530, 3532, 3534, 3538, the noted processing periods can represent processing periods during which time CPU 1060 of terminal 1000 processes stored (e.g., buffered) image data for attempting to decode a decodable indicia.

With further reference to the timing diagram of FIG. 20, an operator at time $t_1$ can select configuration 1 using e.g., button 3452 so that terminal 1000 is set in a configuration in which a lens setting of lens assembly 200 will vary during a read attempt. At time $t_1$, an operator can activate trigger signal 3506. In response to trigger signal 3506 being activated terminal 1000 can expose a plurality of frames of image data.

Referring to the timing diagram of FIG. 20, the energy input level input for establishing a setting of lens assembly 200 is represented by signal 3508 may be at different levels during each of respective exposure periods 3560, 3562, 3564 when terminal 1000 operates in a first (moving lens) configuration. At time $t_2$, trigger signal 3506 can be deactivated e.g., by successful decode or a release of trigger 3408. At time $t_3$, an operator can activate the second configuration as described herein e.g., by actuation of button 3454. Sometime thereafter, an operator may manually select a lens setting of lens assembly 200 e.g., by actuation of a lens setting button 3442, 3444 of terminal 1000 or other provided buttons if terminal 1000 is adapted so that further lens settings are available.

Referring to signal 3508, signal 3508 can be established at an energy level corresponding to the selected lens setting. At time $t_5$, a trigger signal 3506 can be activated again, e.g., by an operator actuation of trigger 3408. A plurality of exposure periods can ensue as seen by signal 3510. When operating in the second configuration, an energization input level into lens assembly 200 and therefore a setting of lens assembly 200 can remain constant. At time $t_6$, trigger signal 3506 can be deactivated e.g., by a release of trigger 3408 or by a successful decode of a message. At time $t_7$, with terminal 1000 still operating in the second configuration, an operator can move a lens setting to a different lens setting e.g., by using a lens setting selection button 3442, 3444 of terminal 1000. In response thereto, an energization level for input energy input into lens assembly 200 can be established at a level correlated to the setting as is seen by signal 3508. A trigger signal 3506 can thereafter be activated again at time $t_8$ and a plurality of exposure periods can ensue with a lens setting remaining at a setting corresponding to the constant lens setting energization level represented by signal 3508 as seen in timing the diagram of FIG. 20. Technologies that are disclosed in U.S. patent application Ser. No. 12/432,434, entitled "FLUID LENS ELEMENT FOR USE IN CHANGING THERMAL OPERATING ENVIRONMENT" filed concurrently herewith, and incorporated herein by reference in its entirety (including image sensor based terminal technologies) can be used with systems, apparatuses, and methods described herein.

Figure 21:
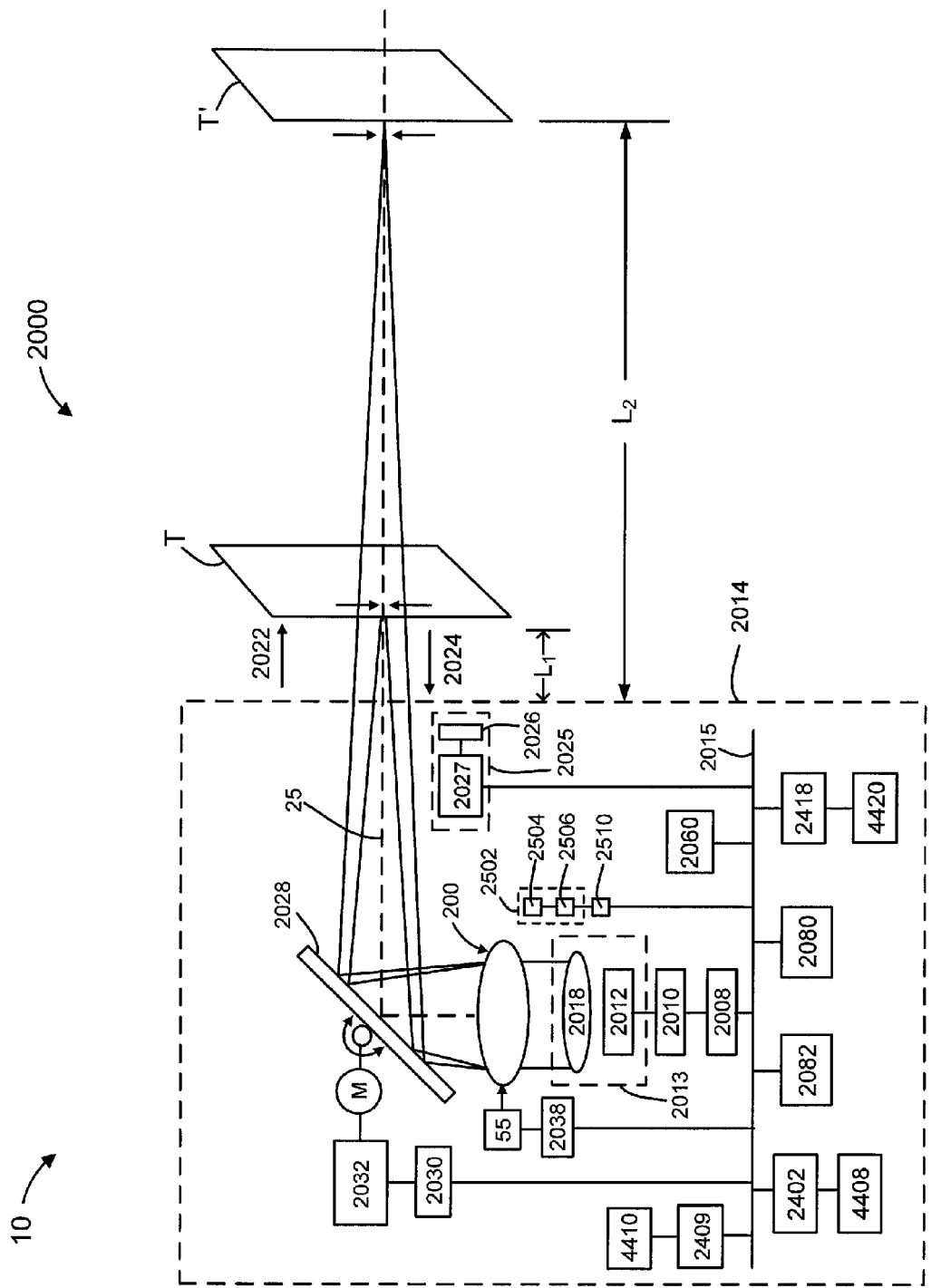
FIG. 21 is a block diagram of a laser scanning based indicia reading terminal having a variable lens assembly.

In FIG. 21 there is shown a lens assembly 200 including lens element 10 disposed in a terminal operative to define a laser scanner based indicia reading terminal 2000.

Referring to FIG. 21, an indicia reading terminal 2000 includes a laser source 2012 supported by a hand held housing 2014. The laser source 2012 can emit a laser beam along an optical path, or axis 25. Laser source 2012 can be coupled to laser source control circuit 2010. Light from laser source 2012 can be shaped by collimating optics 2018 and lens assembly 200. The combination of laser source 2012 and collimating optics 2018 can be regarded as a laser diode assembly 2013. The laser beam travels in an emitting direction 2022 along axis 25 and illuminates a target T, which in one embodiment includes a bar code. A scanning mirror reflector 2028 disposed within the optical path defined by axis 25 oscillates to direct the laser beam across the entire surface to be scanned. Reflector 2028 can be driven by scan motor, M, which is coupled to control circuit 2032.

The laser beam reflects off the target T and travels along axis 25 in a receiving direction 2024 back to a detector 2028. In the example wherein the target T includes a barcode, the incident laser light strikes areas of dark and white bands and is reflected. The reflected beam will thusly have variable intensity representative of the barcode pattern. Detector assembly 2025 including detector 2026 and analog to digital converter 2027 can receive the reflected beam of variable intensity, generate an analog signal corresponding to the reflected beam, and convert it to a digital signal for storage into memory 2080 where it can be processed by CPU 2060 in accordance with a program stored in non-volatile memory 2082, provided in a particular example by an EPROM.

For attempting to decode a bar code symbol, CPU 2060 can process a digitized image signal corresponding to a scanned, reflected, and detected laser beam to determine a spatial pattern of dark cells and light cells and can convert each light and dark cell pattern determined into a character of character string via table lookup. Terminal 2000 can include various interface circuits allowing CPU 2060 to communicate with various circuits of terminal 2000 including interface circuit 2008 coupled to circuit 2010 and system bus 2015, interface circuit 2030 coupled to motor control circuit 2032, and interface circuit 2038 coupled to electrical power input unit 55. Terminal 2000 can also include trigger 4408 which can be actuated to initiate a decode attempt. Manual trigger 4408 can be coupled to interface circuit 2402, which in turn can be coupled to system bus 2015. Terminal 2000 can also include a display 4420 in communication with CPU 2060 via interface 2418 as well as pointer mechanism 4410 in communication with CPU 2060 via interface 2409 coupled to system bus 2015.

Referring to further aspects of indicia reading terminal 2000, terminal 2000 can include electrical power input unit 55 for inputting of energy for changing an optical characteristic of focusing apparatus 100, and therefore changing an optical characteristic (e.g., focal length, plane of optimal focus) of lens assembly 200. In one embodiment, an energy input to lens assembly 200 can be varied to vary a plane of optimum focus of a laser beam that is shaped by optics 2018, 200, 2028. A plane (or distance) of optimum focus of a projected laser beam can be varied between a first distance $L_1$ of optimum focus and a second distance $L_2$ of optimum focus.

In another aspect, terminal 2000 can include a temperature sensing assembly 2502 including a temperature sensor 2504 and an analog to digital converter 2506 for sensing a temperature of fluid containing lens element 10 of lens assembly 200. Temperature sensor 2504 can be disposed at or in proximity with a fluid containing lens element 10 of lens assembly 200. CPU 2060 can be in communication with temperature sensing assembly 2502 via interface 2510 coupled to assembly 2502 and system bus 2015.

Further regarding terminal 2000, an electrical power input for establishing a desired lens setting can be responsive to a temperature sensed by sensor 2504. It has been mentioned that at higher temperatures a lens membrane and/or lens fluid can expand to result in changes in optical characteristics of the lens element. To compensate for the lens element characteristic changes resulting from thermal expansion, an electrical power input for establishing a lens setting of lens assembly 200 can be varied.

Figures 22, 23:
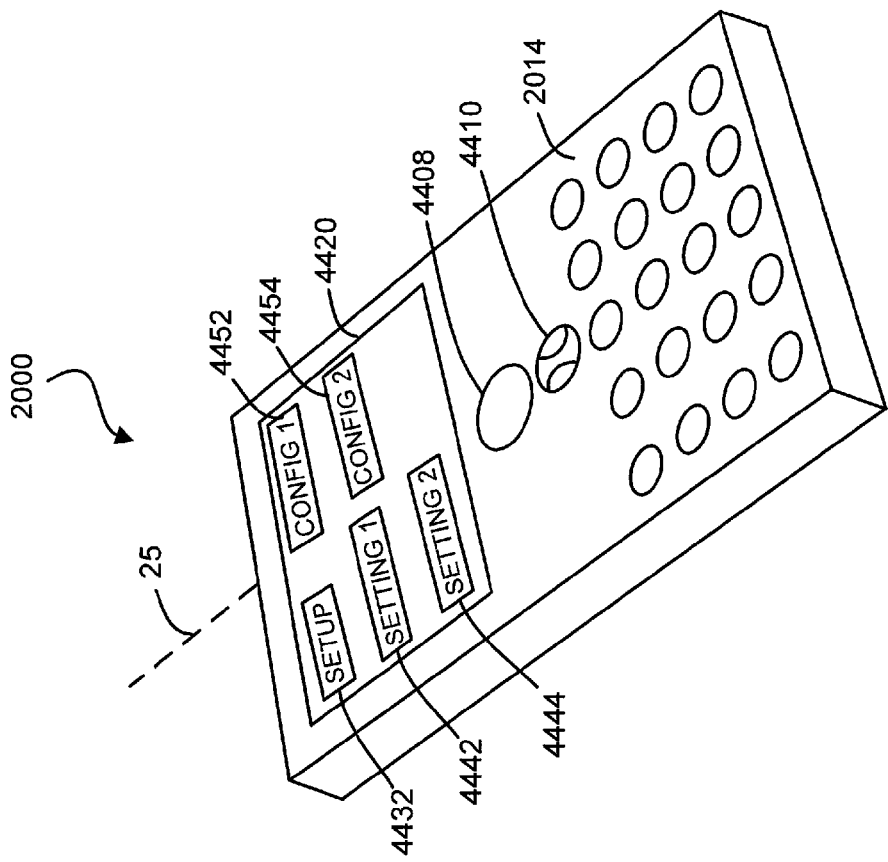
FIG. 22 is a perspective view of an indicia reading terminal having a hand held housing.
FIG. 23 illustrates a table for control of an indicia reading terminal.

A physical form view of a laser scanning based indicia reading terminal 2000 is shown in FIG. 22. Terminal 2000 can include display 4420 and trigger 4408 disposed on a common side of hand held housing 2014. A user interface of terminal 2000 can be provided by display 4420 and pointer mechanism 4410 in combination. A user interface of terminal 2000 can also be provided, e.g., by configuring terminal 2000 to be operative to be programmed by decoding of programming bar code symbols. In another embodiment, hand held housing 2014 can be devoid of a display and can include a gun style form factor.

In another aspect, terminal 2000 can be operated in a setup mode selectable by selection of button 4432 using a user interface of terminal 2000. A setup mode can be activated for determining power inputs corresponding to various lens settings. In a setup mode, terminal 2000 can be operated at various temperatures and a electrical power input can be varied until a desired reference lens setting is achieved. Repeating the process for several settings and sensed temperatures a control table 4490 as shown in FIG. 23 can be established. Once table 4490 is established, the setup mode can be deactivated by de-selection of button 4432 and operated in a run mode. In a run mode, terminal 2000 can operate according to a selected first or second configuration as described herein or according to another configuration. For establishing a certain (e.g., selected) lens setting when operating in a run mode, terminal 2000 can utilize table 4490 for determining a power input level for establishing a certain lens setting. Terminal 2000 in one embodiment, can be operative so that a setup mode can be activated by an end user operator of terminal 2000. In another embodiment, terminal 2000 can be operative so that the setup mode is restricted from being activated by an operator user and can only be activated by a manufacturer provider user. In one embodiment, terminal 2000 can be operative so that a setup mode can be activated prior to the incorporation of terminal components into housing 2014.

Referring to terminal 2000, terminal 2000 can be operative to move a lens setting of lens assembly 200 between at least a first plane of optimum focus setting and a second plane of optimum focus setting. Still further, terminal 2000 can be operative to generate at least a first signal corresponding to a first scan with the lens assembly 200 at the first setting and a second signal corresponding to a second scan with the lens assembly at the second setting, and terminal 2000 can be further operative to attempt to decode a decodable indicia utilizing the first signal and the second signal. The second scan to which the second signal corresponds to can be a successive scan in relation to the first scan or a non-successive subsequent scan in relation to the first scan.

Terminal 2000 can be operative so that terminal 2000 can generate a succession of scans and signals corresponding to the scans when an operator activated read attempt is activated by an operator actuation of a trigger 4408. Terminal 2000 can subject one or more generated signals to a decode attempt and the scanning, signal generating, and decode attempting can continue until a read attempt is deactivated e.g., by a release of trigger 4408 or by a successful decode.

Terminal 2000 in a first operator activated configuration set forth herein can be operative to move a lens setting of lens assembly 200 between at least a first and second lens setting of the lens assembly during a time that terminal 2000 executes an operator activated read attempt of the terminal. Further, terminal 2000 can be operative so that the first and second signals are generated during a single operator activated read attempt.

Indicia reading terminal 2000 in a second operator activated configuration set forth herein can be operative to maintain a lens setting of the terminal at a certain lens setting during a time that the terminal executes an operator activated read attempt of terminal 2000. Terminal 2000 can be operative to move the lens setting in accordance to an operator input command input subsequent to a first operator activated read attempt and prior to a second operator activated read attempt. Terminal 2000 can be operative so that the first signal and the second signal are output during separate first and second operator activated read attempts of terminal 2000.

Terminal 2000 can be operative to move the lens setting of lens assembly 200 between the first lens setting and the second lens setting and in other embodiments additional settings in response to a manual selection of a lens setting by an operator. For example, terminal 2000 can have a user interface comprising a display 4420 and pointer mechanism 4410, and an operator can utilize the user interface to select a lens setting by selection of a displayed button 4442, 4444 corresponding to the desired lens setting. Terminal 2000 can further be operative so that when the second configuration is active, terminal 2000 in response to a trigger signal being made active via actuation of trigger 4408, maintains the lens setting at the selected lens setting through the capture of a plurality of signals, including the first and second signals when attempting to decode a decodable indicia in response to a trigger signal being made active to initiate a decode attempt with use of trigger 4408.

The first described functionality where terminal 2000 moves a lens setting between different lens settings during an operator activated read attempt, and the second described functionality where terminal 2000 maintains a lens setting at a certain setting through a read attempt can each be activated in response to an operator selected configuration selection. Terminal 2000 can be operative so that an operator can select between the first and second configurations using the user interface of terminal 2000 by selection of a button 4452 (first configuration), or button 4454 (second configuration) corresponding to the desired configuration.

Figure 24:
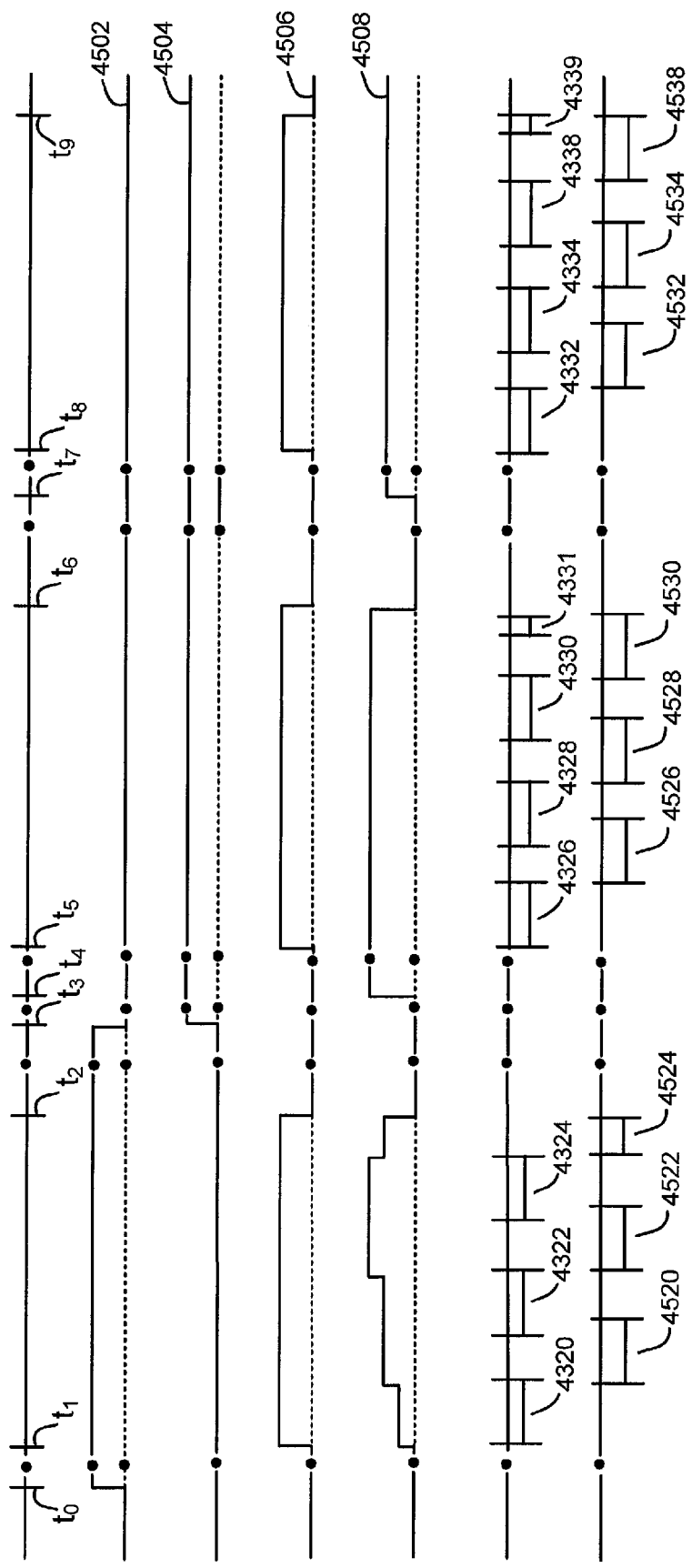
FIG. 24 is a timing diagram illustrating operational aspects of an indicia reading terminal.

A timing diagram further illustrating operation of terminal 2000 in one embodiment is shown in FIG. 24. The timing diagram of FIG. 24 illustrates terminal 2000 undergoing a change in configuration from a first configuration in which a variable lens assembly 200 of terminal 2000 is varied during a read attempt to a second configuration in which a variable lens assembly 200 of terminal 2000 remains at a fixed setting throughout a read attempt.

Referring to the timing diagram of FIG. 24, signal 4502 is a state signal representing an active or inactive state of the first user selectable configuration (moving lens setting). Signal 4504 is a state signal representing the state of a second described user selectable configuration (fixed lens setting). Signal 4506 is a trigger signal which can be made active by actuation of trigger 4408, and which can be deactivated by releasing of trigger 4408 which may become inactive after a time out period or after a successful decode of a decodable indicia. Signal 4506 represents an energy input level input into lens assembly 200 of terminal 2000. Scanning periods 4320, 4322, 4324, 4326, 4328, 4330, 4331, 4332, 4334, 4338, and 4339 are scanning periods during which the described laser beam is scanned across a target for generation of a processable signal.

Referring to processing periods 4520, 4522, 4524, 4526, 4528, 4530, 4532, 4534, 4538, the noted processing periods can represent processing periods during which time CPU 2060 of terminal 2000 processes stored (e.g., buffered) digital signals representing reflected beams reflected from a target for attempting to decode a decodable indicia.

With further reference to the timing diagram of FIG. 24, an operator at time $t_1$ can select configuration 1 using e.g., button 4452 so that terminal 2000 is set in a mode in which a lens setting of lens assembly 200 will vary during a read attempt. At time $t_1$, an operator can activate trigger signal 4506. In response to trigger signal 4506 being activated terminal 2000 can generate a plurality of signals, each representing light reflected from a target during a scan of a light beam thereacross. [00102] Referring to the timing diagram of FIG. 24, the energy input level input for establishing a setting of lens assembly 200 is represented by signal 4508 may be at different levels during each of respective scanning periods 4320, 4322, 4324 when terminal 2000 operates in a first (moving lens) configuration. At time $t_2$, trigger signal 4506 can be deactivated e.g., by successful decode or a release of trigger 4408. At time $t_3$, an operator can activate the second configuration as described herein e.g., by actuation of button 4454. Sometime thereafter, an operator may manually select a lens setting of lens assembly 200 e.g., by actuation of a lens setting button 4442, 4444 of terminal 2000 or other provided buttons if terminal 2000 is adapted so that further lens settings are available.

Referring to signal 4508, signal 4508 can be established at an energy level corresponding to the selected lens setting. At time $t_5$, a trigger signal 4506 can be activated again, e.g., by an operator actuation of trigger 4408. A plurality of scanning periods can ensue as seen by scanning periods 4326, 4328, 4330, 4331. When operating in the second configuration, an energization input level into lens assembly 200 and therefore a setting of lens assembly 200 can remain constant. At time $t_6$, trigger signal 4506 can be deactivated e.g., by a release of trigger 4408 or by a successful decode of a message. At time $t_7$, with terminal 2000 still operating in a second configuration, an operator can move a lens setting to a different lens setting e.g., by using a lens setting selection button 4442, 4444 of terminal 2000. In response thereto, an energization level for establishing a setting of lens assembly 200 can move to a level correlated to the setting as is seen by signal 4508. A trigger signal 4506 can thereafter be activated again at time $t_8$. A plurality of scanning periods 4332, 4334, 4338, 4339 can ensue with a lens setting remaining at a setting corresponding to the constant lens setting energization level during scanning periods 4332, 4334, 4338, 4339 represented by signal 4508 as seen in timing the diagram of FIG. 24. Technologies that are disclosed in U.S. patent application Ser. No. 12/432,517, entitled "LASER SCANNER WITH DEFORMABLE LENS" and U.S. patent application Ser. No. 12/432,534, entitled "LASER SCANNER WITH IMPROVED DECODING" each filed concurrently herewith, and incorporated herein by reference in its entirety (including laser scanning based terminal technologies) can be used with systems, apparatuses, and methods described herein.

Mode, configuration, or setting selections described herein described as being made with use of a user interface comprising a display and pointer mechanism of terminal 1000 or terminal 2000 can also be made with use of another user interface, e.g., by reading of programming bar code symbols.

A small sample of systems methods and apparatus that are described herein is as follows:

A1. An indicia reading terminal comprising:
an imaging assembly including an image sensor having a plurality of pixels;
a memory for storing image data, and a controller for processing the image data for attempting to decode decodable indicia represented in the image data;
a variable lens assembly for focusing an image of a target onto the image sensor, the variable lens assembly having a lens element comprising a deformable membrane and an opposing light transmissive member delimiting a cavity having optical fluid disposed therein, the lens element having an imaging axis, wherein the variable lens assembly further includes an actuator assembly for moving the deformable membrane to thereby change an optical characteristic of the lens element, and wherein the actuator assembly includes a piezoelectric actuator;
wherein the indicia reading terminal is operative to move a lens setting of the lens assembly between at least first and second different lens settings, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens setting, and wherein the terminal is further configured so that the terminal is operative to subject each of the first and second frames of image data to a decode attempt for decoding of a decodable indicia.

A2. The indicia reading terminal of claim A1, wherein the terminal is operative to move a lens setting of the lens assembly between the first and the second lens settings of the lens assembly during a time that the terminal executes an operator activated read attempt of the terminal, the terminal further being operative so that the first and second frames are exposed during a single operator activated read attempt of the terminal.

A3. The indicia reading terminal of claim A1, wherein the terminal is operative to maintain a lens setting of the lens assembly at a certain lens setting during a time that the terminal executes an operator activated read attempt of the terminal, the terminal being operative to move the lens setting in accordance with an operator input command input subsequent to a first operator activated read attempt and prior to a second operator activated read attempt, the terminal further being operative so that the first frame of image data and the second frame of image data are exposed during separate first and second separate operator activated read attempts of the terminal.

A4. The indicia reading terminal of claim A1, wherein the actuator assembly comprises a piezoelectric actuator and a push ring, the lens assembly being arranged so that the push ring is interposed between the actuator and the deformable membrane.

A5. The indicia reading terminal of claim A1, wherein the piezoelectric actuator is provided by a hollowed disc piezoelectric actuator having a hollowed portion disposed about the imaging axis and being arranged to generally oppose the deformable membrane, the hollowed disc piezoelectric actuator being a bimorph piezoelectric actuator having a first piezoceramic layer and a second piezoceramic layer.

A6. The indicia reading terminal of claim A1, wherein the piezoelectric actuator is provided by a linear piezoelectric actuator arranged substantially in parallel with the surface of the deformable membrane, the actuator being configured so that when a thickness of the piezoelectric actuator changes an optical characteristic of the lens element changes.

A7. The indicia reading terminal of claim A1, wherein the actuator assembly includes a pivoting member pivotally arranged on stationary member, the actuator assembly further having a piezoelectric actuator and being arranged so that a shape change of the piezoelectric actuator causes movement of the pivoting member, the actuator assembly further being arranged so that movement of the pivoting member causes movement of the deformable membrane.

A8. The indicia reading terminal of claim A1, wherein the lens assembly is configured so that a member of the actuator assembly is normally biased to compress the deformable membrane, and wherein the piezoelectric actuator is arranged so that a shape change of the piezoelectric actuator changes the amount of compression of the deformable membrane.

A9. The indicia reading terminal of claim A1, wherein the lens assembly includes a focusing apparatus comprising a housing and wherein the actuator assembly comprises a push ring supported by the housing that is normally biased to compress the fluid lens element, wherein the actuator assembly further includes an actuator arranged so that movement of the actuator changes a position of the push ring to change an amount of compression of the fluid lens element.

A10. The indicia reading terminal of claim A1, wherein the lens assembly comprises a focusing apparatus having:
a fluid lens element comprising a deformable membrane partially defining a cavity, the cavity holding optical fluid;
an actuator assembly operative for imparting force to the fluid lens element to change an optical characteristic of the deformable membrane;
a pocket into which the fluid lens element is disposed, the pocket being delimited on a first side by a structural member of the actuator assembly;
wherein there is further disposed in the pocket a resilient member;
wherein the focusing apparatus is further configured so that a width of the pocket can be adjusted during manufacture of the focusing apparatus for achieving a positional relationship of predetermined criteria between the fluid lens element and members of the focusing apparatus that define the pocket.

A11. The indicia reading terminal of claim A1, wherein the piezoelectric actuator is provided by a hollowed disc piezoelectric actuator having a hollowed portion disposed about the imaging axis and being arranged to generally oppose the deformable membrane, the hollowed disc piezoelectric actuator being a bimorph piezoelectric actuator having a first piezoceramic layer and a second piezoceramic layer, the hollowed portion having a non-circular profile so that tabs are defined by the hollowed disc piezoelectric actuator as seen by a front view thereof.

B1. An indicia reading terminal comprising:
a laser source emitting laser light;
a scanning apparatus for scanning the laser light across the target, wherein the terminal is operative so that a plane of optimum focus of the laser light scanned across the target varies based on a present lens setting of the lens assembly;
a variable lens assembly for focusing the laser light onto a target, the variable lens assembly having a lens element comprising a deformable membrane and an opposing light transmissive member delimiting optical fluid disposed in the cavity, the lens element having an imaging axis, wherein the variable lens assembly further includes an actuator assembly for moving the deformable membrane to thereby change an optical characteristic of the lens element, and wherein the actuator assembly includes a piezoelectric actuator;
wherein the terminal is operative to move a lens setting of the lens assembly between a first lens setting and a second lens setting, wherein the lens assembly has a first plane of optimum focus at the first lens setting and a second plane of optimum focus at the second lens setting, said terminal further being operative to generate a first signal corresponding to a first scan with the lens assembly at the first lens setting and a second signal corresponding to a second scan with the lens assembly at the second lens setting, and wherein the terminal is further operative to attempt to decode a decodable indicia utilizing the first signal and the second signal.

B2. The indicia reading terminal of claim B1, wherein the terminal is operative to move a lens setting of the lens assembly between the first and the second lens settings of the lens assembly during a time that the terminal executes an operator activated read attempt of the terminal, the terminal further being operative so that the first and second signals are generated during a single operator activated read attempt.

B3. The indicia reading terminal of claim B1, wherein the terminal is operative to maintain a lens setting of the terminal at a certain lens setting during a time that the terminal executes an operator activated read attempt of the terminal, the terminal being operative to move the lens setting in accordance to an operator input command input subsequent to a first operator activated read attempt and prior to a second operator activated read attempt, the terminal further being operative so that the first signal and the second signal are output during separate first and second operator activated read attempts of the terminal.

B4. The indicia reading terminal of claim B1, wherein the actuator assembly comprises a piezoelectric actuator and a push ring, the lens assembly being arranged so that the push ring is interposed between the actuator and the deformable membrane.

B5. The indicia reading terminal of claim B1, wherein the piezoelectric actuator is provided by a hollowed disc piezoelectric actuator having a hollowed portion disposed about the imaging axis and being arranged to generally oppose the deformable membrane, the hollowed disc piezoelectric actuator being a bimorph piezoelectric actuator having a first piezoceramic layer and a second piezoceramic layer.

B6. The indicia reading terminal of claim B1, wherein the piezoelectric actuator is provided by a linear piezoelectric actuator arranged substantially in parallel with a surface of the deformable membrane, the actuator being configured so that when a thickness of the piezoelectric actuator changes an optical characteristic of the lens element changes.

B7. The indicia reading terminal of claim B1, wherein the actuator assembly includes a pivoting member pivotally arranged on stationary member, the actuator assembly further having a piezoelectric actuator and being arranged so that a shape change of the piezoelectric actuator causes movement of the pivoting member, the actuator assembly further being arranged so that movement of the pivoting member causes movement of the deformable membrane.

B8. The indicia reading terminal of claim B1, wherein the lens assembly is configured so that a member of the actuator assembly is normally biased to compress the deformable membrane, and wherein the piezoelectric actuator is arranged to that a shape change of the piezoelectric actuator changes the amount of compression of the deformable membrane.

B9. The indicia reading terminal of claim B1, wherein the lens assembly includes a focusing apparatus comprising a housing and wherein the actuator assembly comprises a push ring supported by the housing that is normally biased to compress the fluid lens element, wherein the actuator assembly further includes an actuator arranged so that movement of the actuator changes a position of the push ring to change an amount of compression of the fluid lens element.

B10. The indicia reading terminal of claim B1, wherein the lens assembly comprises a focusing apparatus having:
a fluid lens element comprising a deformable membrane partially defining a cavity, the cavity holding optical fluid;
an actuator assembly operative for imparting force to the fluid lens element to change an optical characteristic of the deformable membrane;
a pocket into which the fluid lens element is disposed, the pocket being delimited on a first side by a structural member of the actuator assembly;
wherein there is further disposed in the pocket a resilient member;
wherein the focusing apparatus is further configured so that a width of the pocket can be adjusted during manufacture of the focusing apparatus for achieving a positional relationship of predetermined criteria between the fluid lens element and members of the focusing apparatus that define the pocket.

B11. The indicia reading terminal of claim B1, wherein the piezoelectric actuator is provided by a hollowed disc piezoelectric actuator having a hollowed portion disposed about the imaging axis and being arranged to generally oppose the deformable membrane, the hollowed disc piezoelectric actuator being a bimorph piezoelectric actuator having a first piezoceramic layer and a second piezoceramic layer, the hollowed portion having a non-circular profile so that tabs are defined by the hollowed disc piezoelectric actuator as seen by a front view thereof.

C1. A focusing apparatus comprising:
a fluid lens element comprising a deformable membrane partially defining a cavity, the cavity holding optical fluid;
an actuator assembly operative for imparting force to the fluid lens element to change an optical characteristic of the deformable membrane;
a pocket into which the fluid lens element is disposed, the pocket being delimited on a first side by a structural member of the actuator assembly;
wherein there is further disposed in the pocket a resilient member;
wherein the focusing apparatus is further configured so that a width of the pocket can be adjusted during manufacture of the focusing apparatus for achieving a positional relationship of predetermined criteria between the fluid lens element and members of the focusing apparatus that define the pocket.

C2. The focusing apparatus of claim C1, wherein the resilient member is disposed about the periphery of the fluid lens element to retain the fluid lens element.

C3. The focusing apparatus of claim C1, wherein the resilient member in an unstressed state has a greater thickness than the fluid lens element in an unstressed state.

C4. The focusing apparatus of claim C1, wherein the actuator assembly comprises a hollowed disc bimorph piezoelectric actuator arranged to generally oppose the deformable membrane.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. An indicia reading terminal comprising:
    an imaging assembly including an image sensor having a plurality of pixels;
    a memory for storing image data, and a controller for processing the image data for attempting to decode decodable indicia represented in the image data;
    a variable lens assembly for focusing an image of a target onto the image sensor, the variable lens assembly having a lens element comprising a deformable membrane and an opposing light transmissive member delimiting a cavity having optical fluid disposed therein, the lens element having an imaging axis extending through the deformable membrane, wherein the variable lens assembly further includes an actuator assembly for moving the deformable membrane to thereby change an optical characteristic of the lens element, and wherein the actuator assembly includes a piezoelectric actuator;
    wherein the indicia reading terminal is operative to move a lens setting of the lens assembly between at least first and second different lens settings, the lens assembly having a first plane of optimum focus at the first lens setting and a second plane of optimum focus at the second lens setting, the indicia reading terminal further being operative to expose a first frame of image data with the lens assembly at the first lens setting and a second frame of image data with the lens assembly at the second lens setting, and wherein the terminal is further configured so that the terminal is operative to subject each of the first and second frames of image data to a decode attempt for decoding of a decodable indicia, wherein the piezoelectric actuator is provided by a hollowed disc piezoelectric actuator having a hollowed portion disposed about the imaging axis and having a first piezoceramic layer and a second piezoceramic layer that extend substantially in parallel with the deformable membrane.

2. The indicia reading terminal of claim 1, wherein the terminal is operative to move a lens setting of the lens assembly between the first and the second lens settings of the lens assembly during a time that the terminal executes an operator activated read attempt of the terminal, the terminal further being operative so that the first and second frames are exposed during a single operator activated read attempt of the terminal.

3. The indicia reading terminal of claim 1, wherein the terminal is operative to maintain a lens setting of the lens assembly at a certain lens setting during a time that the terminal executes an operator activated read attempt of the terminal, the terminal being operative to move the lens setting in accordance with an operator input command input subsequent to a first operator activated read attempt and prior to a second operator activated read attempt, the terminal further being operative so that the first frame of image data and the second frame of image data are exposed during separate first and second separate operator activated read attempts of the terminal.

4. The indicia reading terminal of claim 1, wherein the actuator assembly comprises a piezoelectric actuator and a push ring, the lens assembly being arranged so that the push ring is interposed between the actuator and the deformable membrane.

5. The indicia reading terminal of claim 1, wherein the hollowed disc piezoelectric actuator is a bimorph piezoelectric actuator having the first piezoceramic layer and the second piezoceramic layer.

6. The indicia reading terminal of claim 1, wherein the piezoelectric actuator is provided by a linear piezoelectric actuator arranged substantially in parallel with a surface of the deformable membrane, the actuator being configured so that when a thickness of the piezoelectric actuator changes an optical characteristic of the lens element changes.

7. The indicia reading terminal of claim 1, wherein the lens assembly is configured so that a member of the actuator assembly is normally biased to compress the deformable membrane, and wherein the piezoelectric actuator is arranged so that a shape change of the piezoelectric actuator changes an amount of compression of the deformable membrane.

8. The indicia reading terminal of claim 1, wherein the lens assembly includes a focusing apparatus comprising a housing and wherein the actuator assembly comprises a push ring supported by the housing that is normally biased to compress the lens element, wherein the actuator assembly further includes an actuator arranged so that movement of the actuator changes a position of the push ring to change an amount of compression of the lens element.

9. The indicia reading terminal of claim 1, wherein the lens assembly comprises a focusing apparatus having:
    a fluid lens element comprising a deformable membrane partially defining a cavity, the cavity holding optical fluid;
    an actuator assembly operative for imparting force to the fluid lens element to change an optical characteristic of the deformable membrane;
    a pocket into which the fluid lens element is disposed, the pocket being delimited on a first side by a structural member of the actuator assembly;
    wherein there is further disposed in the pocket a resilient member;
    wherein the focusing apparatus is further configured so that a width of the pocket can be adjusted during manufacture of the focusing apparatus for achieving a positional relationship of predetermined criteria between the fluid lens element and members of the focusing apparatus that define the pocket.

10. The indicia reading terminal of claim 1, wherein the hollowed disc piezoelectric actuator is a bimorph piezoelectric actuator having the first piezoceramic layer and the second piezoceramic layer, the hollowed portion having a non-circular profile so that tabs are defined by the hollowed disc piezoelectric actuator as seen by a front view thereof.

11. An indicia reading terminal comprising:
    a laser source emitting laser light;
    a variable lens assembly for focusing the laser light onto a target, the variable lens assembly having a lens element comprising a deformable membrane and an opposing light transmissive member delimiting optical fluid disposed in a cavity, the lens element having an imaging axis extending thought the deformable membrane, wherein the variable lens assembly further includes an actuator assembly for moving the deformable membrane to thereby change an optical characteristic of the lens element, and wherein the actuator assembly includes a piezoelectric actuator;

a scanning apparatus for scanning the laser light across the target, wherein the terminal is operative so that a plane of optimum focus of the laser light scanned across the target varies based on a present lens setting of the lens assembly;

wherein the terminal is operative to move a lens setting of the lens assembly between a first lens setting and a second lens setting, wherein the lens assembly has a first plane of optimum focus at the first lens setting and a second plane of optimum focus at the second lens setting, said terminal further being operative to generate a first signal corresponding to a first scan with the lens assembly at the first lens setting and a second signal corresponding to a second scan with the lens assembly at the second lens setting, and wherein the terminal is further operative to attempt to decode a decodable indicia utilizing the first signal and the second signal, wherein the piezoelectric actuator is provided by a hollowed disc piezoelectric actuator having a hollowed portion disposed about the imaging axis and having a first piezoceramic layer and a second piezoceramic layer that extend substantially in parallel with the deformable membrane.

12. The indicia reading terminal of claim 11, wherein the terminal is operative to move a lens setting of the lens assembly between the first lens setting and the second lens setting of the lens assembly during a time that the terminal executes an operator activated read attempt of the terminal, the terminal further being operative so that the first and second signals are generated during a single operator activated read attempt.

13. The indicia reading terminal of claim 11, wherein the terminal is operative to maintain a lens setting of the terminal at a certain lens setting during a time that the terminal executes an operator activated read attempt of the terminal, the terminal being operative to move the lens setting in accordance to an operator input command input subsequent to a first operator activated read attempt and prior to a second operator activated read attempt, the terminal further being operative so that the first signal and the second signal are output during separate first and second operator activated read attempts of the terminal.

14. The indicia reading terminal of claim 11, wherein the actuator assembly comprises a piezoelectric actuator and a push ring, the lens assembly being arranged so that the push ring is interposed between the actuator and the deformable membrane.

15. The indicia reading terminal of claim 12, wherein the hollowed disc piezoelectric actuator is a bimorph piezoelectric actuator having a first piezoceramic layer and a second piezoceramic layer.

16. The indicia reading terminal of claim 11, wherein the piezoelectric actuator is provided by a linear piezoelectric actuator arranged substantially in parallel with a surface of the deformable membrane, the actuator being configured so that when a thickness of the piezoelectric actuator changes an optical characteristic of the lens element changes.

17. The indicia reading terminal of claim 11, wherein the lens assembly is configured so that a member of the actuator assembly is normally biased to compress the deformable membrane, and wherein the piezoelectric actuator is arranged to that a shape change of the piezoelectric actuator changes the amount of compression of the deformable membrane.

18. The indicia reading terminal of claim 11, wherein the lens assembly includes a focusing apparatus comprising a housing and wherein the actuator assembly comprises a push ring supported by the housing that is normally biased to compress the lens element, wherein the actuator assembly further includes an actuator arranged so that movement of the actuator changes a position of the push ring to change an amount of compression of the lens element.

19. The indicia reading terminal of claim 11, wherein the lens assembly comprises a focusing apparatus having:
  a fluid lens element comprising a deformable membrane partially defining a cavity, the cavity holding optical fluid;
  an actuator assembly operative for imparting force to the fluid lens element to change an optical characteristic of the deformable membrane;
  a pocket into which the fluid lens element is disposed, the pocket being delimited on a first side by a structural member of the actuator assembly;
  wherein there is further disposed in the pocket a resilient member;
  wherein the focusing apparatus is further configured so that a width of the pocket can be adjusted during manufacture of the focusing apparatus for achieving a positional relationship of predetermined criteria between the fluid lens element and members of the focusing apparatus that define the pocket.

20. The indicia reading terminal of claim 11, wherein the hollowed disc piezoelectric actuator is a bimorph piezoelectric actuator having the first piezoceramic layer and the second piezoceramic layer, the hollowed portion having a non-circular profile so that tabs are defined by the hollowed disc piezoelectric actuator as seen by a front view thereof.

21. A focusing apparatus comprising:
  a fluid lens element comprising a deformable membrane partially defining a cavity, the cavity holding optical fluid;
  an actuator assembly operative for imparting force to the fluid lens element to change an optical characteristic of the deformable membrane;
  a pocket into which the fluid lens element is disposed, the pocket being delimited on a first side by a structural member of the actuator assembly;
  wherein there is further disposed in the pocket a resilient member;
  wherein the focusing apparatus is further configured so that a width of the pocket is adapted to be adjusted for achieving a positional relationship of predetermined criteria between the fluid lens element and members of the focusing apparatus that define the pocket, wherein the resilient member in an unstressed state has a greater thickness than the fluid lens element in an unstressed state.

22. The focusing apparatus of claim 21, wherein the resilient member is disposed about a periphery of the fluid lens element to retain the fluid lens element.

23. The focusing apparatus of claim 21, wherein the actuator assembly comprises a hollowed disc bimorph piezoelectric actuator arranged to generally oppose the deformable membrane.

24. The focusing apparatus of claim 21, wherein the resilient member is a generally ring shaped member disposed about a periphery of the fluid lens element.

25. The focusing apparatus of claim 21, wherein the resilient member includes a closed periphery.

26. The focusing apparatus of claim 21, wherein the resilient member has an inner profile of the fluid lens element.

27. The focusing apparatus of claim 21, wherein the resilient member is configured to impart a resistance force greater than a resistance force of the fluid lens element.

28. The focusing apparatus of claim 21, wherein the resilient member is provided by a leaf spring.

29. The focusing apparatus of claim 21, wherein the resilient member is provided by a gasket.

* * * * *

UNITED STATES PATENT AND TRADEMARK OFFICE
CERTIFICATE OF CORRECTION

PATENT NO.        : 8,282,004 B2
APPLICATION NO.   : 12/432480
DATED             : October 9, 2012
INVENTOR(S)       : Wang et al.

Page 1 of 1

It is certified that error appears in the above-identified patent and that said Letters Patent is hereby corrected as shown below:

Column 25, Line 55: Claim 15, Delete "claim 12" and insert -- claim 11 --

Signed and Sealed this
First Day of January, 2013

David J. Kappos
*Director of the United States Patent and Trademark Office*